(12) United States Patent
    Mendez

(10) Patent No.: US 12,222,045 B2
(45) Date of Patent: Feb. 11, 2025

(54) PISTON ACTIVATED CARTRIDGE VALVES AND THE COMPONENTS THEREOF

(71) Applicant: Government of the United States, as represented by the Secretary of the Air Force, Wright-Patterson AFB, OH (US)

(72) Inventor: Edgar G Mendez, California City, CA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 383 days.

(21) Appl. No.: 17/573,675

(22) Filed: Jan. 12, 2022

(65) Prior Publication Data

US 2022/0252180 A1     Aug. 11, 2022

Related U.S. Application Data

(60) Provisional application No. 63/148,202, filed on Feb. 11, 2021.

(51) Int. Cl.
| | |
|---|---|
| *F16K 31/524* | (2006.01) |
| *F16K 11/14* | (2006.01) |
| *F16K 11/16* | (2006.01) |
| *F16L 41/02* | (2006.01) |
| *F16K 31/163* | (2006.01) |

(52) U.S. Cl.
CPC ........ *F16K 31/52416* (2013.01); *F16K 11/14* (2013.01); *F16K 11/161* (2013.01); *F16L 41/021* (2013.01); *F16K 31/163* (2013.01)

(58) Field of Classification Search
CPC .. F16K 31/52416; F16K 11/14; F16K 11/161; F16K 31/163; F16L 41/021
See application file for complete search history.

(56) References Cited

U.S. PATENT DOCUMENTS

| | | |
|---|---|---|
| 961,738 A | 6/1910 | Stickel |
| 1,961,738 A | 6/1910 | Stickel |

(Continued)

OTHER PUBLICATIONS

US Patent Office Action in co-pending U.S. Appl. No. 17/573,676 mailed Jun. 20, 2023.

(Continued)

*Primary Examiner* — Craig M Schneider
*Assistant Examiner* — Christopher D Ballman
(74) *Attorney, Agent, or Firm* — AFMCLO/JAZ; Jeffrey V. Bamber

(57) ABSTRACT

Valves, the components used to create valves and, more particularly, to piston-activated cartridge valves. The valves include cartridge valve assemblies having a housing and a slidable member. One end of the slidable member extends outward beyond the second end of the cartridge housing, and can be contacted by an actuator piston to open the valve. The interior surface of the cartridge housing and the sides of the slidable member are configured so that when the slidable member is in the open position, at least one fluid flow path is provided between the first and second openings of the cartridge housing so that fluid can flow either: (a) from the first opening to the second opening; or (b) from the second opening to the first opening.

12 Claims, 21 Drawing Sheets

(56) References Cited

U.S. PATENT DOCUMENTS

| | | | |
|---|---|---|---|
| 1,679,898 A | 8/1928 | Gilbert | |
| 2,170,478 A | 8/1939 | Long et al. | |
| 2,301,439 A | 11/1942 | Moen | |
| 2,351,874 A | 6/1944 | Parker | |
| 2,373,654 A | 4/1945 | Beekley et al. | |
| 2,420,588 A | 5/1947 | Dunnihoo | |
| 2,499,318 A | 2/1950 | Jungerhans | |
| 2,574,054 A | 11/1951 | Miller | |
| 2,641,437 A | 6/1953 | Jay et al. | |
| 2,710,023 A | 6/1955 | Blackford et al. | |
| 2,761,463 A | 9/1956 | Wagner | |
| 2,876,788 A | 3/1959 | Shube | |
| 2,943,639 A | 7/1960 | Smith | |
| 3,181,790 A | 4/1965 | Smith | |
| 3,749,122 A | 7/1973 | Gold | |
| 4,148,338 A | 4/1979 | Skoli | |
| 4,291,719 A | 9/1981 | Lehmann | |
| 4,398,553 A | 8/1983 | Perrine | |
| 4,953,589 A * | 9/1990 | Nakamura | F02M 59/462 137/543.23 |
| 4,977,927 A | 12/1990 | Hill | |
| 5,033,503 A | 7/1991 | Horton et al. | |
| 5,195,552 A | 3/1993 | Nehm | |
| 5,494,069 A * | 2/1996 | Bergmann | F16K 17/196 137/493.2 |
| 6,152,171 A | 11/2000 | Messick et al. | |
| 6,474,363 B1 | 11/2002 | Stephenson | |
| 6,802,332 B1 | 10/2004 | Stuart | |
| 7,222,637 B2 * | 5/2007 | Miyajima | F16K 17/082 137/515 |
| 7,287,545 B2 | 10/2007 | Zelson | |
| 7,395,836 B2 | 7/2008 | Krebs et al. | |
| 7,434,593 B2 | 10/2008 | Noll et al. | |
| 7,559,530 B2 | 7/2009 | Korogi et al. | |
| 7,740,023 B2 | 6/2010 | Zweber | |
| 8,047,502 B2 | 11/2011 | Paffrath | |
| 8,205,641 B2 | 6/2012 | Richardson et al. | |
| 8,281,806 B2 | 10/2012 | Seppmann | |
| 8,726,932 B2 * | 5/2014 | Matsubara | F16K 15/026 137/542 |
| 9,644,356 B1 * | 5/2017 | Gass | E03B 7/078 |
| 9,677,717 B2 | 6/2017 | Jenks | |
| 9,777,850 B1 * | 10/2017 | Handley | F16K 1/427 |
| 9,869,402 B2 * | 1/2018 | Ho | F16K 15/063 |
| 9,958,079 B2 | 5/2018 | Morris et al. | |
| 10,184,735 B2 | 1/2019 | Sheppard et al. | |
| 10,385,982 B2 | 8/2019 | Patterson et al. | |
| 10,428,963 B2 | 10/2019 | Barreda | |
| 11,841,085 B1 | 12/2023 | Mendez | |
| 2006/0021659 A1 * | 2/2006 | Andersson | F16L 29/007 137/515 |

OTHER PUBLICATIONS

US Patent Office Action in co-pending U.S. Appl. No. 17/573,676 mailed Mar. 17, 2023.
US Patent Office Action in co-pending U.S. Appl. No. 17/573,676 mailed Dec. 12, 2022.
U.S. Appl. No. 17/573,676, filed Jan. 12, 2022, Mendez.

* cited by examiner

PISTON ACTIVATED CARTRIDGE VALVES AND THE COMPONENTS THEREOF

Pursuant to 37 C.F.R. § 1.78(a)(4), this application claims the benefit of and priority to prior filed Provisional application Ser. No. 63/148,202, filed Feb. 11, 2021, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to valves, the components used to create valves and, more particularly, to piston-activated cartridge valves.

BACKGROUND OF THE INVENTION

Piping and fluid components are used in many different industries to contain and transfer fluid as part of a process or operation. In aerospace applications, fluids can be stored in tanks then transferred to consuming components such as turbine or liquid rocket engines. Some fluids must be vented to atmosphere to lower pressure in the piping circuits or tanks. Further, liquid transfer systems often require a bleed device to remove any trapped vapor in the system. These liquid transfer or process systems also require a purge system to provide inert contents during repair or removal of system components.

When examining complexity and application of components for aerospace applications such as rocket engines, the main propellant feed systems include fuel and oxidizer piping systems. Each of these main propellant systems has ancillary plumbing requirements to drain or purge the main propellant systems. These ancillary systems require sufficient reliability with minimal leakage when connected to main propellant feed systems which requires operation in a wide range of temperatures, pressures and flows.

Valves are used in fluid process systems to transfer fluids to or from main supply piping systems. Connecting valves to piping or tubing circuits require fittings with sealing surfaces. These sealing surfaces provide a contact area for the sealing material to provide a leak tight joint. The fittings are manufactured connection components having various flow paths and connection types such as tees, elbows, crosses, unions, etc. Fittings can be conventionally machined, forged, welded or additively manufactured and may use pipe flanges, tubing flares, threads, piping hubs or similar components to seal the joint.

Each connection requires labor to assemble and is a potential leak path. As the number of connections increase, the potential for higher rework labor cost due to galling, stripping or damage to threaded or flange sealing surfaces increase. The weight of the system also increases proportionally to the number of connection joints employed therein. It is desirable to provide a reliable low cost light weight, leak free valve and plumbing assemblies for such systems; accordingly, there remains a need for further contributions in this area of technology.

A need, therefore, exists for improvements to piping and fluid components to contain and transfer fluid contents as part of a process or operation. In particular, a need exists for piping and fluid components that reduce the number of connections and potential leak paths, and reduce the costs and complexity of fluid circuits, particularly in the aerospace industry.

SUMMARY OF THE INVENTION

While the invention will be described in connection with certain embodiments, it will be understood that the invention is not limited to these embodiments. To the contrary, this invention includes all alternatives, modifications, and equivalents as may be included within the spirit and scope of the present invention.

The present invention relates generally to valves, the components used to create valves and, more particularly, to piston-activated cartridge valves ("PACV's"). A system comprising a plurality of insertable devices that are used to create various valve configurations is also provided herein, as are various fluid circuits that can be created using the insertable devices described herein.

One of the components that may comprise an invention in its own right, or as part of the system, is a cartridge valve assembly. The cartridge valve assembly comprises a cartridge housing having a first end defining a first opening, a second end defining a second opening, a generally cylindrical exterior, an internal space extending between the first and second openings, and an interior surface defining the internal space. A movable slidable member is located within the internal space of the cartridge housing. The slidable member is movable between a closed position and an open position. The interior surface of the cartridge housing and the sides of the slidable member are configured so that when the slidable member is in the open position, at least one fluid flow path is provided between the first and second openings of the cartridge housing, wherein fluid can flow in one of the following directions: (a) from the first opening to the second opening and (b) from the second opening to the first opening.

Another component that may comprises an invention in its own right, or as part of the system, is an actuator piston, which may be part of an actuator piston assembly.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention provides valves, the components used to create valves, and piston-activated cartridge valves. A system comprising a plurality of insertable devices that are used to create various valve configurations is also provided herein, as are various fluid circuits that can be created using the insertable devices described herein.

Figure 1:
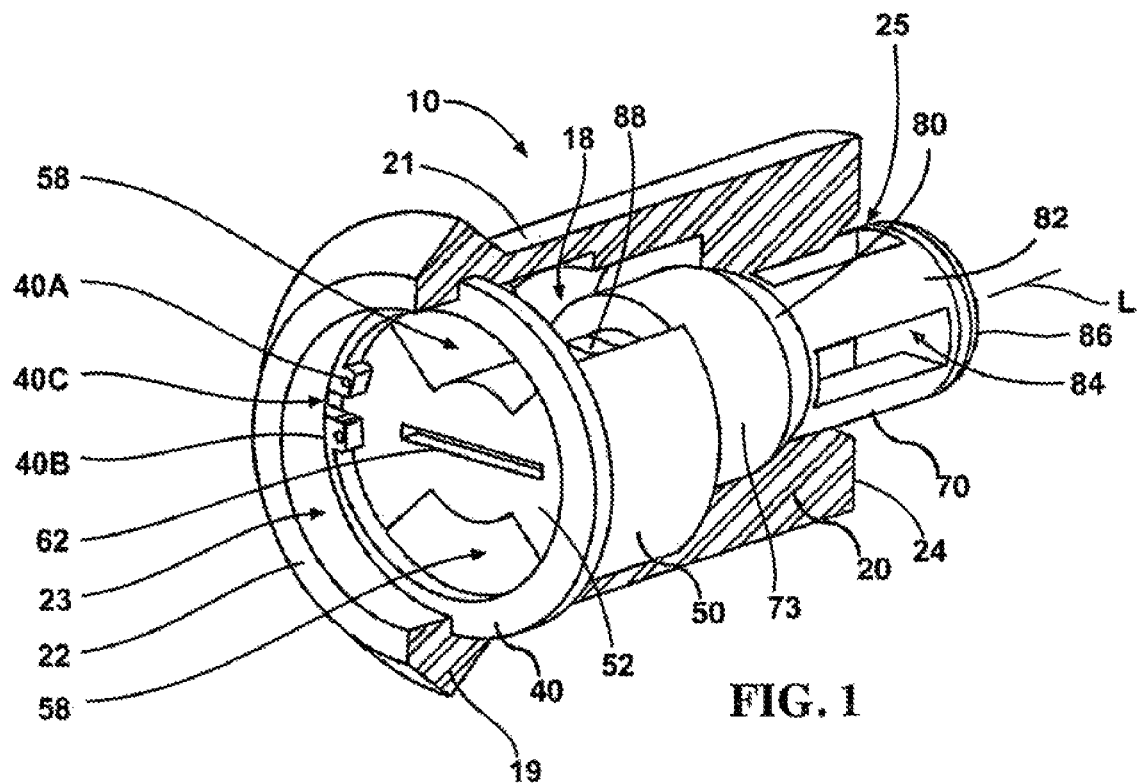
FIG. 1 is a perspective cut away view of one embodiment of the cartridge valve assembly.

FIG. 1 shows a portion of one embodiment of a cartridge valve assembly (or piston activated cartridge valve ("PACV")) 10. The cartridge valve assembly 10 has a longitudinal axis L. The cartridge valve assembly 10 comprises a cartridge housing 20 which accommodates a slidable member 70, a stop 50, a spring 88 that biases the slidable member 70 away from the stop 50 into a normally closed position in this embodiment, and a retaining member such as clip 40. The cartridge valve assembly 10 comprises one of the plurality of insertable devices described above. The cartridge valve assembly 10 can be inserted into a pipe of a typical fluid fitting with at least one branch connection in order to control the flow of fluids (such as liquids) through the pipe.

Figure 2:
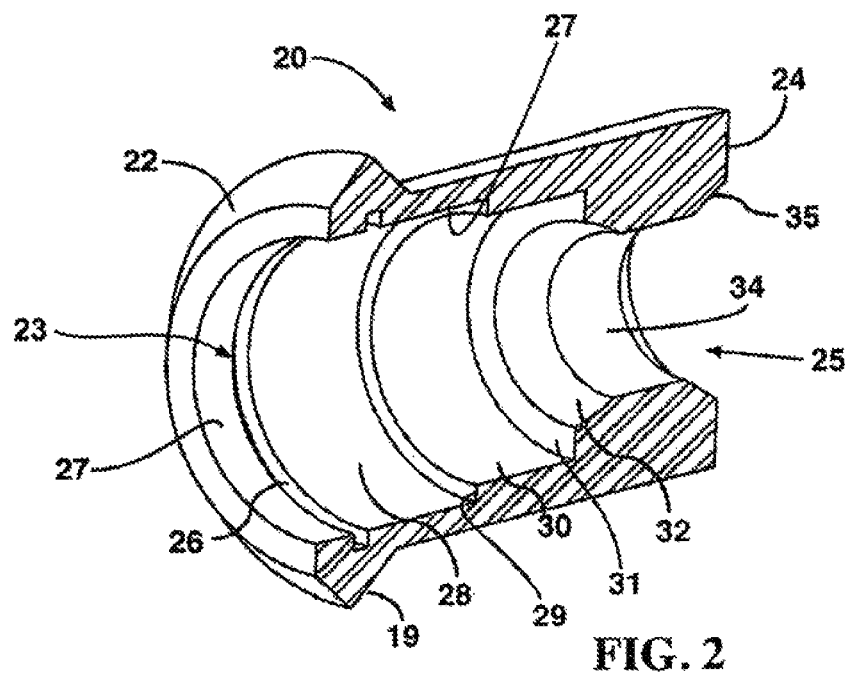
FIG. 2 is a perspective cut away view of the cartridge housing for the cartridge valve assembly of FIG. 1.

FIGS. 1 and 2 show the cartridge housing 20. The cartridge housing 20 has a longitudinal axis, a first end (or "retention end") 22 defining a first opening 23, and a second end (or "slidable member end") 24 defining a second opening 25. The longitudinal axis of the cartridge housing 20 and that of the cartridge valve assembly 10 coincide in this embodiment. The longitudinal axis of the cartridge housing 20 extends between the first and second ends 22 and 24 of the cartridge housing 20 along the length of the cartridge housing 20. Depending on how the cartridge housing 20 is oriented with respect to the connecting fluid circuits, the first opening 23 can be an inlet or an outlet and the second opening 25 can be an outlet or an inlet. The cartridge housing 20 has a generally cylindrical exterior (or "exterior surface") 21, an internal space 18 extending between the first and second openings 23 and 25, and an interior surface 27 defining the internal space 18.

The first end 22 of the cartridge housing 20 may comprise a flange 19 that projects outward from the generally cylindrical exterior of the cartridge housing to limit the insertion depth of the cartridge housing 20 within the body of a fitting which may comprise a pipe or tubing flow circuit. The second end 24 of the cartridge housing 20 may comprise a flared portion 35 along the interior surface wall that flares out from a smaller opening into a larger opening.

The interior surface 27 of the cartridge housing 20 may have several distinct surfaces in the form of steps, bores, sections, or recesses therein. There may be any suitable number of such distinct surfaces. The number of surfaces may depend on the configuration of the stop 50 and the slidable member 70. At least a portion of the interior surface 27 of the cartridge housing 20 may have a circular cross-section (or a configuration of the interior of a hollow cylinder). In various embodiments described herein, however, some portions of the interior surface 27 of the cartridge housing 20 may have non-circular cross-sections.

Figure 5:
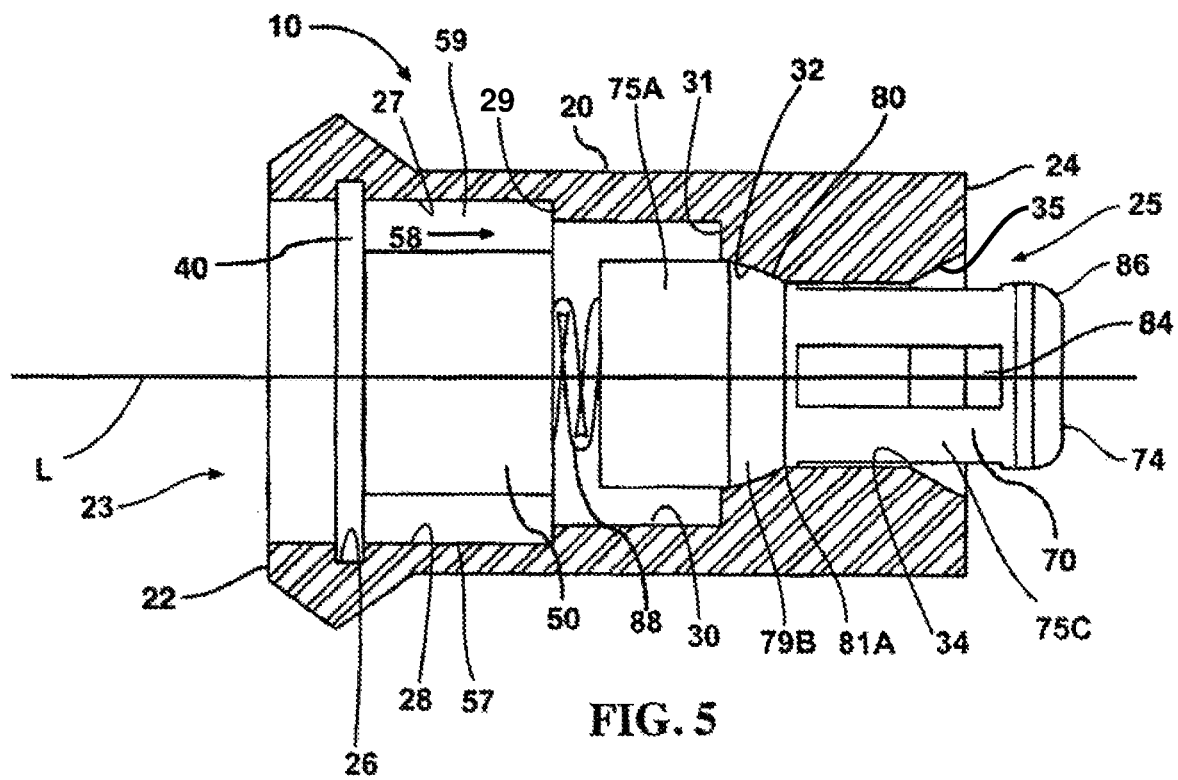
FIG. 5 is a cut away side view of the cartridge valve assembly of FIG. 1 in the closed position.

FIGS. 1, 2, and 5 show that, in one embodiment, the interior surface 27 of the cartridge housing 20 comprises from the first end 22 of the cartridge housing 20 to the second end 24 of the cartridge housing: a recess 26, such as a circumferential recess, for holding the retaining member 40; a first section 28; a stop abutment wall 29; a second section 30; a transition wall 31; a third section 32; and a fourth section 34 of the interior surface. The first section (or "stop bore") 28 holds and encloses the stop 50 (and may at least partially enclose some of the other components in certain embodiments). The second section (or "slidable member bore") 30 holds and at least partially encloses a first portion of the slidable member 70. The third section (or "seat") 32 provides a sealing surface. The fourth section (or "slide surface") 34 holds and partially encloses a second portion of the slidable member 70. As shown in FIG. 5, the relationship between the dimensions of the cross-sections of the first, second, third, and fourth sections 28, 30, 32, and 34 is one in which the cross-sectional dimensions (e.g., diameters) become smaller when proceeding from the first end 22 to the second end 24 of the cartridge housing. Thus, the cross-sectional dimension of the first section 28 is greater than that of the second section 30, etc. This is the case until reaching the flared portion 35 that widens to a greater cross-sectional dimension than that of the fourth section 34.

Figure 27:
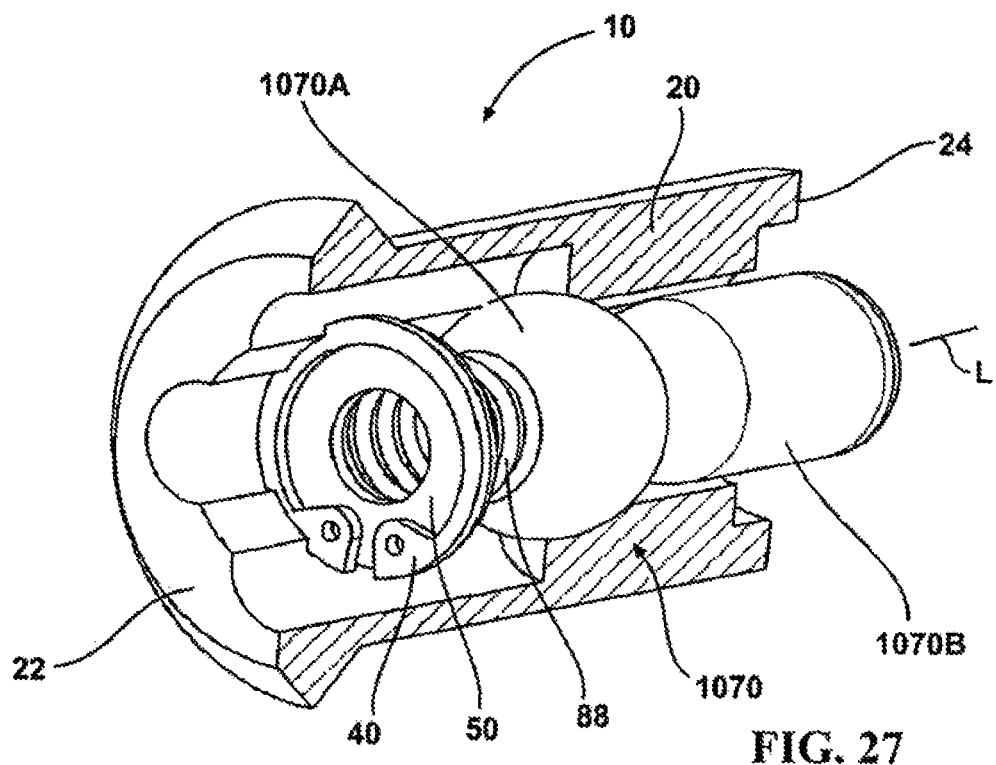
FIG. 27 is a cut away perspective view of an alternative slidable member comprising multiple parts.
Figure 28:
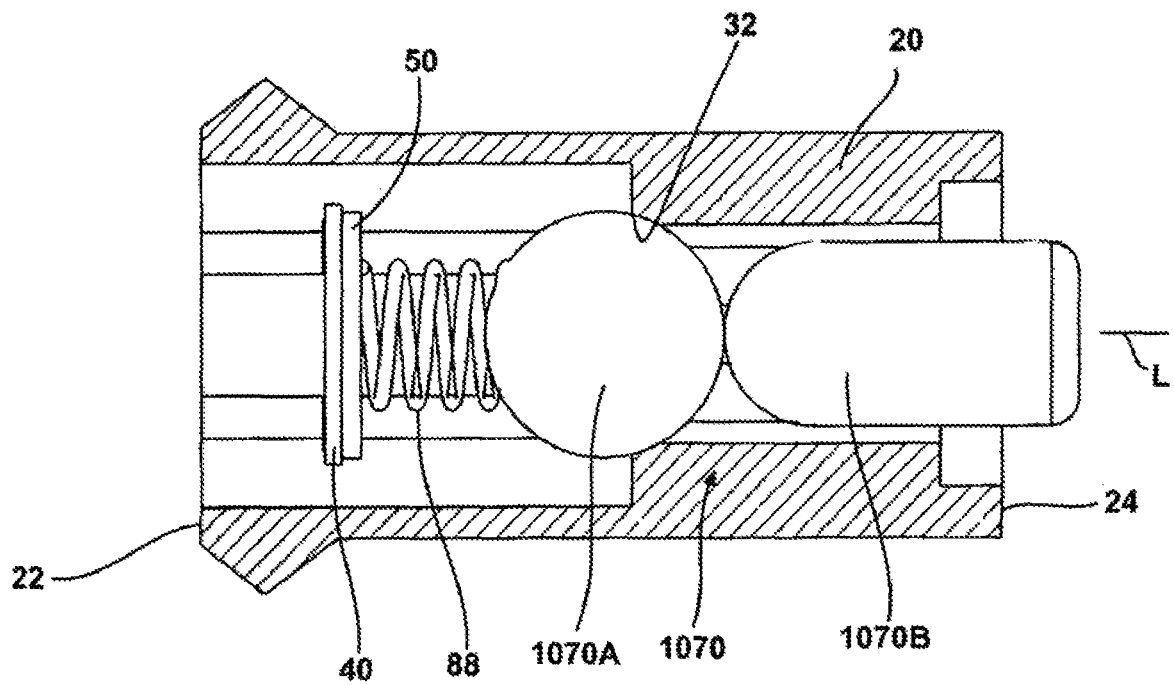
FIG. 28 is a cut away side view of the slidable member comprising multiple parts shown in FIG. 27.

The sealing surface formed by the third section 32 may have any suitable configuration. In some cases, the sealing surface may be tapered such that it narrows when proceeding along the longitudinal centerline of the cartridge housing toward the second end 24 of the cartridge housing 20. The sealing surface may, for example, be angular (or partially conical) as shown in FIGS. 1, 2, and 5 where it has a side cross-section formed of rectilinear segments. In alternative embodiments, as shown in FIGS. 27 and 28 the sealing surface may have a rounded configuration where it has a side cross-section formed of curvilinear segments. The term "tapered", as used herein, will cover any such configurations that narrow toward the second end 24 of the cartridge housing 20.

Figure 3:
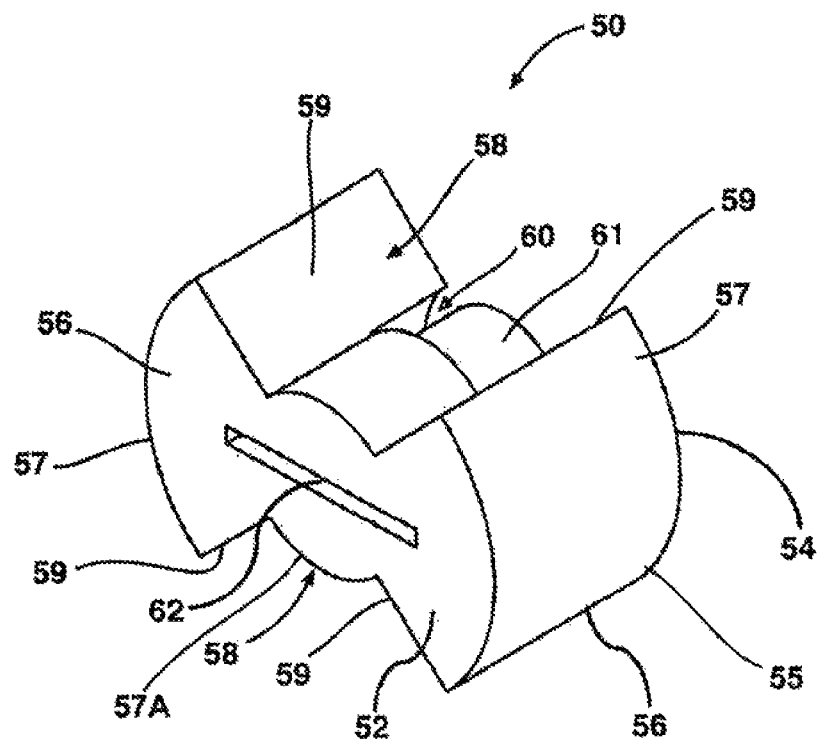
FIG. 3 is a perspective view of a stop for the cartridge valve assembly of FIG. 1.

One embodiment of the stop 50 is shown in greater detail in FIG. 3. The stop 50 provides a surface against which one end of the spring 88 biasing the slidable member 70 is prevented from moving longitudinally. The stop 50 is located within first section 28 of the internal space of the cartridge housing 20. The stop 50 has a longitudinal axis, a length, a first end 52, a second end 54, and sides 55. The longitudinal axis of the stop 50 extends between the first and second ends 52 and 54 of the stop along the length of the stop. The longitudinal axis of the stop 50 and that of the cartridge valve assembly 10 coincide in this embodiment. The stop 50 can be of any suitable length and width (or diameter), provided that the width of the stop 50 is less than the width of the first section 28 of the interior surface 27 of the cartridge housing 20. The length of the stop 50 may in various embodiments be less than, equal to, or greater than the width of the stop.

The stop 50 can have any suitable configuration provided that it has certain features. The first feature is that it is able to be held in place within the first section 28 of the cartridge housing 20. The second feature is that there is at least one fluid flow path 58 between the sides 55 of the stop 50 and the first section 28 of the cartridge housing 20. A first portion 57 of the sides 55 of the stop 50 are in contact with the first section 28 of the interior surface of the cartridge housing 20. This may require that the stop 50 be at least partially cylindrical. In this embodiment, the first portion 57 comprises a pair of partially cylindrical outer surfaces. In the embodiment shown in FIGS. 1, 3, and 5, a second portion 59 of the sides 55 of the stop 50 extending longitudinally from the first end to the second end of the stop form inner walls that are not in contact with (that is, they are spaced away from) the first section 28 of the cartridge housing 20 so that at least one fluid flow path (or flow channel) 58 is formed along the length of the stop from the first end 52 of the stop 50 to the second end 54 of the stop. A plurality of flow paths 58 can be formed along the length of the stop from the first end 52 of the stop to the second end 54 of the stop.

The flow paths 58 between the second portion 59 of the sides of the stop 50 and the first section 28 of the cartridge housing 20 can be provided in at least two different ways. The first way is shown in FIGS. 1 and 3. In this embodiment of the stop 50, the second portion 59 of the sides of the stop 50 have recesses therein to provide flow channels. The flow channels 58 may have any suitable configuration. In FIGS. 1 and 3, the stop 50 has a cross-sectional shape with portions of a pie-shaped piece removed therefrom (except for at the center of the pie, which forms a segment of a circle). The recesses are, thus, defined by generally planar side walls 59 and an inner partial cylindrical surface 57A that is near the center of the cross-section of the stop 50. The remaining portions of the stop can be considered to form a pair of ears 56. The first section 28 of the cartridge housing 20 in this embodiment does not require any recesses therein to complete the formation of the flow channels 58. Of course, recesses may also be provided in the first section 28 of the cartridge housing 20 to contribute to the formation of flow channels.

FIG. 3 shows that the stop 50 may have several additional features. For example, the first end 52 of the stop 50 may have a tool groove or slot 62 therein for use in inserting a threaded stop into the cartridge housing 20 and adjusting the position of the stop 50. The second end 54 of the stop 50 may have a spring recess (or "spring groove") 60 therein for retaining one end of a spring. The spring recess 60 may be in any suitable configuration, such in the configuration of a hollow cylindrical shape that is removed from the second end 54 of the stop 50 in the embodiment shown in the drawings. This provides a spring hub 61 on the second end 54 of the stop 50.

Figure 2A:
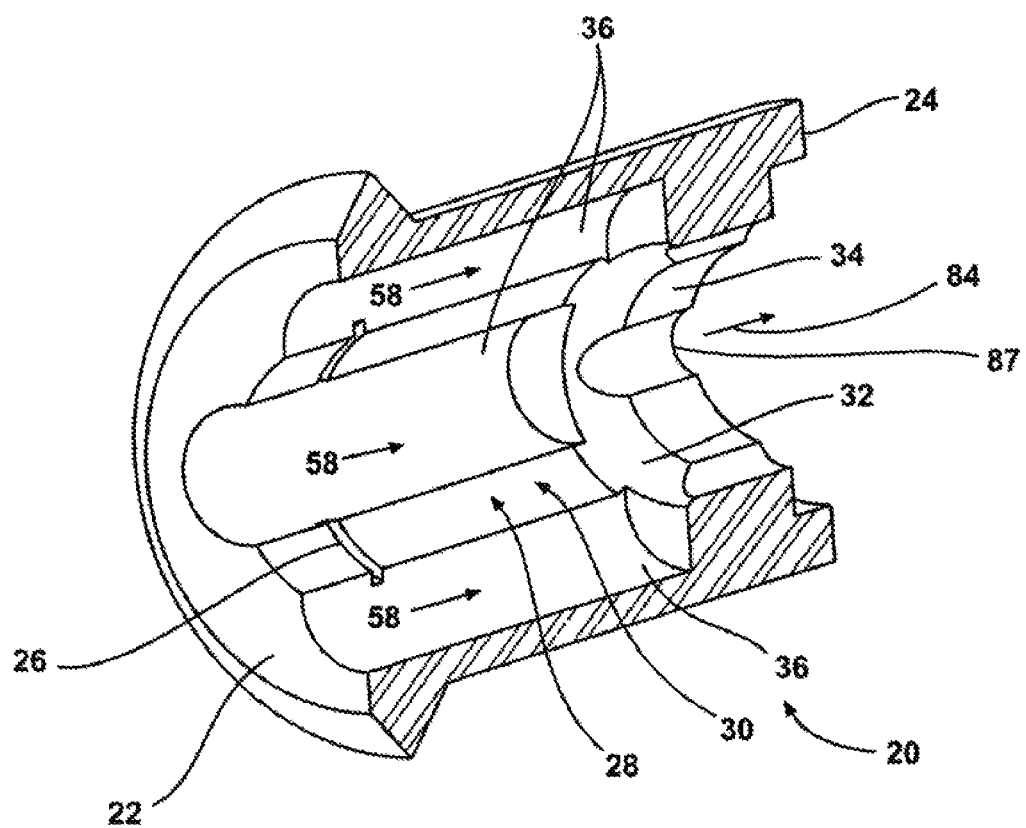
FIG. 2A is a perspective cut away view of an alternative embodiment of the cartridge housing.
Figure 3A:
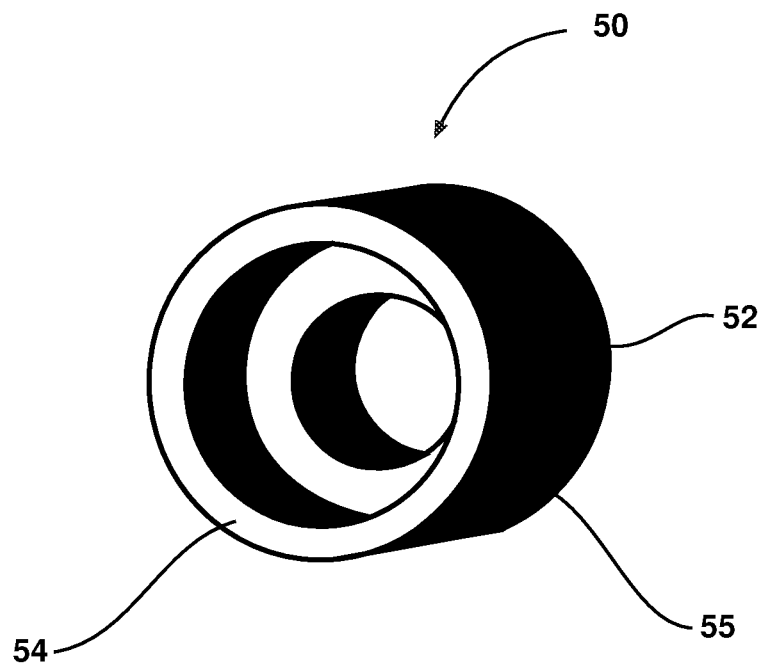
FIG. 3A is a perspective view of an alternative stop for the cartridge valve assembly.
Figure 3B:
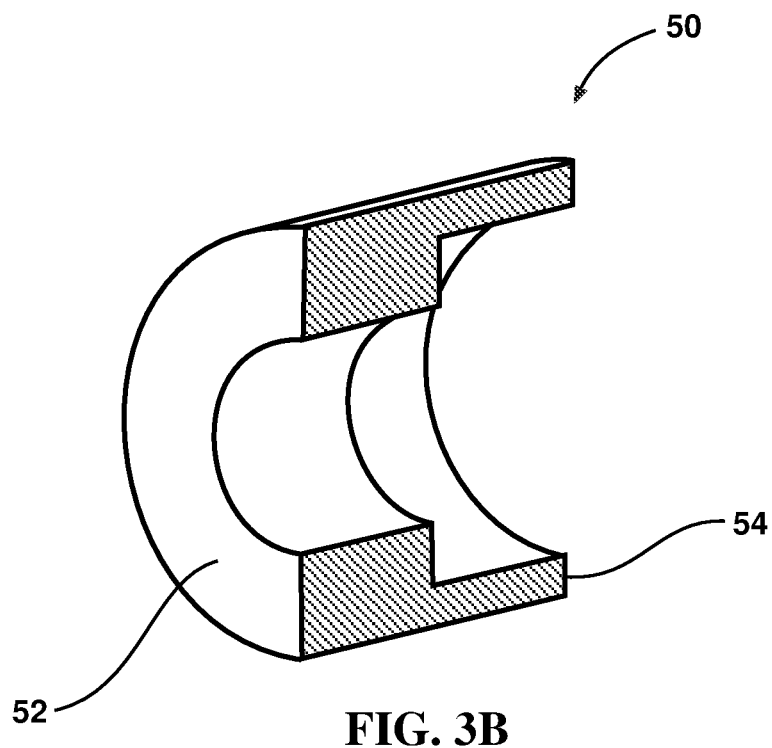
FIG. 3B is a cut away perspective view of the alternative stop shown in FIG. 3A.

FIG. 2A shows an alternative way of providing the flow paths 58 between the sides 55 of the stop 50 and the first section 28 of the cartridge housing 20. In this embodiment, the flow channels 58 adjacent to the sides of the stop 50 are formed by one or more (i.e., a plurality of) recesses 36 in the first section 28 of the interior surface of the cartridge housing 20. In this case, as shown in FIG. 3A, the stop 50 may have a cylindrical configuration (and may resemble a thick washer), and the sides 55 of the stop 50 do not need to have recesses therein to form flow channels around the stop 50.

FIG. 1 shows the slidable member (or "slide") 70 is located at least partially within the internal space 18 of the cartridge housing 20. The slidable member 70 is shown in greater detail in FIG. 4. The slidable member 70 has a first end 72, a second end 74, and sides 73. The slidable member 70 comprises a first portion 75A, an intermediate portion 75B, and a second portion 75C.

The first portion 75A of the slidable member extends from the first end 72 of the slidable member to the intermediate portion 75B of the slidable member. The first portion 75A of the slidable member 70 fits completely within a portion of the internal space of the cartridge housing 20. The first portion 75A of the slidable member 70 can have any suitable configuration. In the embodiment shown in FIGS. 1 and 4, the first portion 75A is cylindrical. The first portion 75A of the slidable member 70 has an outer surface 78 that has a cross-section that is smaller than the cross-section of the second portion 30 of the internal space 18 of the cartridge housing 20 and is spaced away from the interior surface 27 of the cartridge housing 20. This provides a space for fluid to flow between the outer surface 78 of the first portion of the slidable member 70 and the interior surface 27 of the cartridge housing 20. (In other embodiments, the outer surface 78 may be in contact with the cartridge housing and comprise an outer bearing surface.) The first end 72 of the slidable member 70 may have a recess therein, such as a spring recess (or "spring groove") 76 which extends into the first end 72 of the slidable member 70 toward the intermediate portion thereof.

The intermediate portion 75B of the slidable member 70 has one end joined to the first portion 75A of the slidable member 70 and its other end joined to second portion 75C of the slidable member 70. In the embodiment shown in FIGS. 1 and 4, the first portion 75A, intermediate portion 75B, and second portion 75C are integral parts of a single component. In other embodiments, they may comprise separate components. The intermediate portion 75B of the slidable member 70 has a tapered outer surface 80 which forms a sealing surface with the third section 32 of the interior surface of the cartridge housing 20. The tapered outer surface 80 narrows in width from the boundary with the first portion 75A of the slidable member 70 to the boundary with the second portion 75C. The intermediate portion 75B of the slidable member 70 may have any suitable configuration that provides a sealing surface. In the embodiment shown in FIGS. 1 and 4, the tapered outer surface 80 has a truncated conical configuration.

Figure 4:
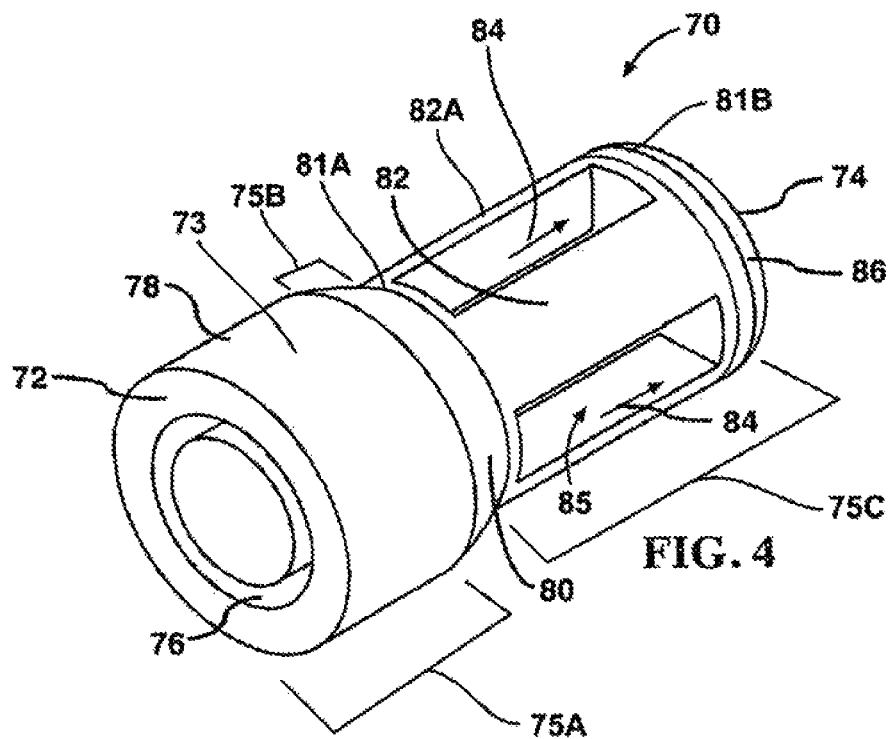
FIG. 4 is a perspective view of a slidable member for the cartridge valve assembly of FIG. 1.

The second portion 75C of the slidable member 70 extends from the intermediate portion 75B of the slidable member to the second end 74 of the slidable member. The second portion 75C of the slidable member 70 has a first end 81A, a second end 81B, and sides 82. In the embodiment shown in FIGS. 1 and 4, the second portion 75C of the slidable member 70 has a generally cylindrical configuration. The first end 81A of the second portion 75C of the slidable member 70 fits completely within the internal space 18 of the cartridge housing 20. The second end 81B of the second portion 75C of the slidable member 70 is the same as the second end 74 of the slidable member 70. The second end 74 of the slidable member 70 protrudes from the second opening 25 of the cartridge housing to a rounded tip 86 as shown in FIGS. 4 and 5. The second portion 75C of the slidable member 70 has an outer surface defined by sides 82 that has a cross-section that is slightly smaller than the cross-section of the fourth section 34 of the internal space of the cartridge housing 20 so that the slidable member 70 may slide longitudinally within the fourth section 34 of the cartridge housing 20.

A first portion 82A of the surface of the sides 82 of the second portion 75C of the slidable member 70 is in sliding contact with the fourth section 34 of the interior surface of the cartridge housing 20. A second portion of the sides 82 of the second portion 75C of the slidable member that extends longitudinally at least part of the way between the first end 81A to the second end 81B of the second portion 75C of the slidable member 70 is not in contact with (that is, is spaced away from) the fourth section 34 of the cartridge housing. As shown in FIG. 5, at least one fluid flow path (or flow channel) 84 is formed along the length of the second portion 75C of the slidable member 70 from a location adjacent the first end 81A of the second portion 75C of the slidable member 70 to a location adjacent to the second end 74 of slideable member 70 which extends beyond the second end 24 of the cartridge housing 20. The flow path(s) 84 allow fluid to flow between the outer surface of the second portion 75C of the slidable member 70 and the fourth section 34 of the interior surface 27 of the cartridge housing 20. As shown in FIGS. 1 and 4, a plurality of flow paths 84 can be formed along the length of the second portion 75C of the slidable member 70 from a location adjacent the first end 81A of the second portion 75C of the slidable member 70 to a location adjacent to the second end 74 of slideable member 70 which extends beyond the second end 24 of the cartridge housing 20.

Figure 10:
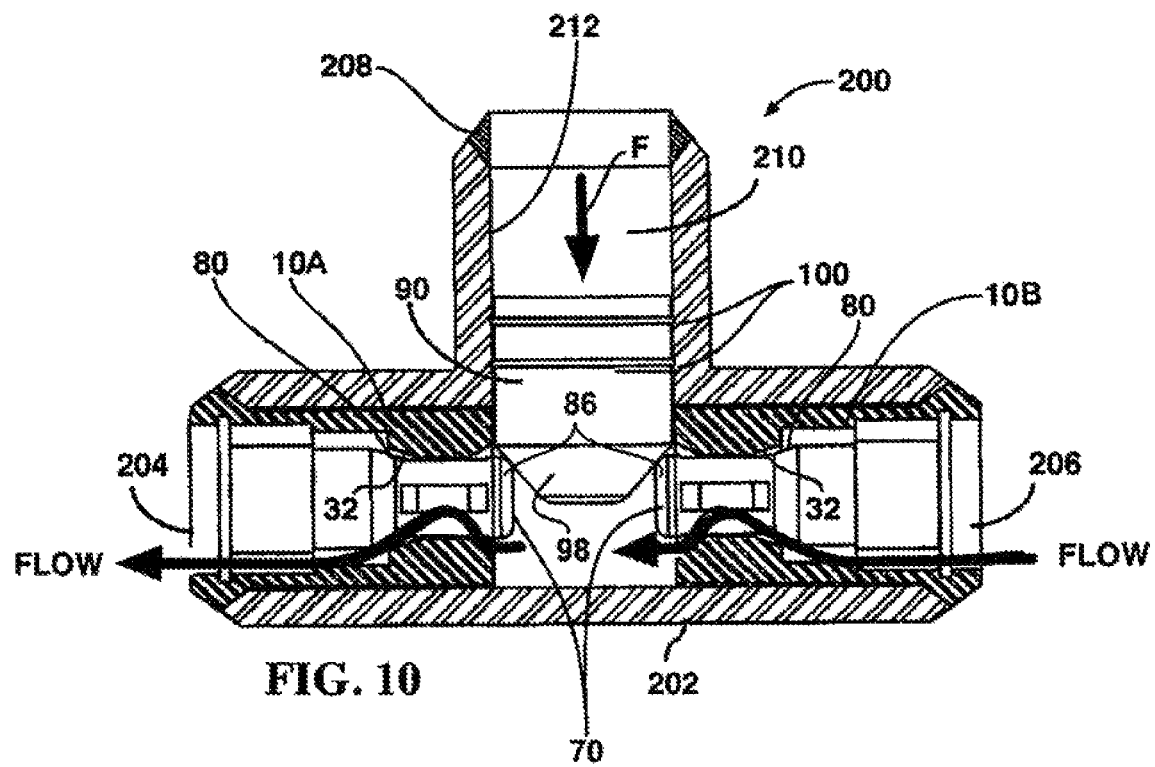
FIG. 10 is a cut away view of PACV Tee assembly with its cartridge valves in the open position.

The flow paths 84 between the outer surface of the second portion 75C of the slidable member 70 and the interior surface 27 of the cartridge housing 20 can be provided in at least two different ways. The first way is shown in FIGS. 1, 4, and 5. In this embodiment of the slidable member 70, the second portion of the sides 82 of the slidable member 70 has at least one recess (or a plurality of) recesses 85 therein to provide flow channels 84 when the valve is opened as shown in FIG. 10. The flow channels 84 may have any suitable configuration. In FIGS. 1, 4, and 5, the recesses 85 are defined by a plurality of rectilinear channels in the side walls 82 of the second portion of the slidable member 70. There may be any suitable number of such recesses. As shown in FIG. 4, there are four recesses 85 that are disposed radially around the second portion 75C of the slidable member 70. The recesses 85 in this embodiment terminate short of the intermediate portion 75B and the second end 74 of the second portion 75C of the slidable member 70. The fourth section 34 of the cartridge housing 20 in this embodiment does not require any recesses therein to complete the formation of the flow channels 84. Of course, recesses may also be provided in the fourth section 34 of the cartridge housing 20 for this purpose as shown in FIG. 2A and FIGS. 25-28.

As shown in FIGS. 1 and 4, the second end 74 of the slidable member 70 is closed. In alternative embodiments, there can be one or more openings in the second end 74 of the slidable member 70. Such openings can be provided so long as the second end 74 has a surface configuration that allows an actuator piston to freely move the slidable member 70 when the actuator piston contacts the tip 86. One example of an embodiment in which the second end has an opening is one in which the second end 74 has a center hole in the tip 86. Another example is one in which the second end 74 has a spoked profile with spokes having open channels between the spokes that minimally disrupts the application of force on the second end 74 of the slidable member 70 by an actuator piston.

FIG. 2A shows an alternative way of providing the flow channels 84 between the sides 82 of the second portion 75C of the slidable member 70 and the fourth section 34 of the cartridge housing 20. In the embodiment shown in FIG. 2A, the flow channels 84 adjacent to the sides of the slidable member 70 are formed by at least one (or a plurality of) recesses 87 in the fourth section 34 of the interior surface of the cartridge housing 20. In such an embodiment, the second portion 75C of the slidable member 70 may have a cylindrical configuration, and the sides 82 of the second portion 75C of the slidable member 70 does not need to have recesses therein as shown in FIG. 4 and in the embodiment shown in FIGS. 25 and 26.

FIGS. 1 and 5 show that the spring 88 is positioned between the stop 50 and the slidable member 70. The spring 88 can comprise any suitable type of component or spring that is capable of biasing the slidable member 70 away from the stop 50 when the spring 88 is uncompressed, and toward the stop 50 when the spring 88 is compressed. In the embodiment shown in the drawings, the spring 88 has two ends, wherein the first end of the spring is adjacent the second end 54 of the stop 50, and the second end of the spring 88 is adjacent the first end 72 of the slidable member 70. It should be understood that the ends of the spring may be inserted into a recess in the second end 54 of the stop 50 and/or a recess in the first end 72 of the slidable member 70, and for the purposes of the present description, will still be considered to be adjacent the ends of those respective components.

FIG. 1 shows a retaining member 40 for holding the first end 52 of the stop 50 in place positioned within the cartridge housing 20. The retaining member 40 can comprise any suitable structure that is capable of holding the first end 52 of the stop 50 in place in position within the cartridge housing 20. In the embodiment shown in the drawings, the retaining member 40 is a relatively thin, flat, generally ring-shaped component which has a break therein so that there is a gap 40C formed where two ends 40A and 40B of the body of the ring-shaped retaining member 40 are spaced apart. This allows the ends 40A and 40B of the retaining member 40 to be squeezed together so that the retaining member 40 can be inserted into the retaining member groove 26 in the cartridge housing 20.

FIG. 5 shows the piston-activated cartridge valve ("PACV") assembly 10 in a closed position. The closed position may be the normal position when no force is applied to second end 74 of the slidable member 70. FIG. 5 shows the relationships of slidable member 70, spring 88, stop 50 and retaining member 40 as they are disposed within the cartridge housing 20. As shown in FIG. 5, the spring 88 is in an uncompressed condition so that the sloped sealing surface 80 of the intermediate portion 75B of the slidable member 70 is in contact with the angular sealing surface of the third section 32 of the inside surface 27 of the cartridge housing 20 to prevent fluids from flowing through the inside of the cartridge housing from one end 22 thereof to the other end 24.

Figure 6:
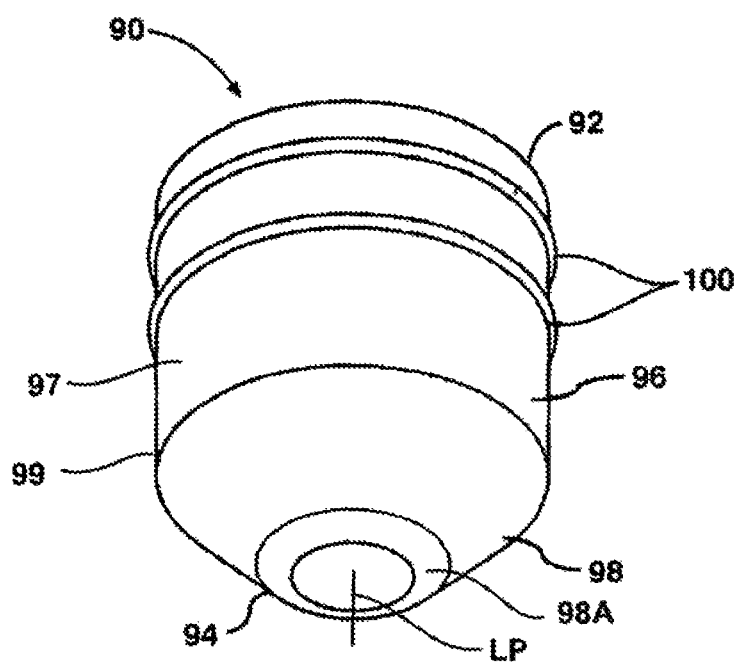
FIG. 6 is a perspective view of an actuator piston.

FIG. 6 shows another one of the insertable devices that comprises part of the system described herein. FIG. 6 shows one embodiment of an actuator piston 90 that may be used to open and/or close the flow of fluid through one or more of the cartridge valve assemblies 10 described above. The actuator piston 90 can be actuated in any suitable manner including, but not limited to mechanically, hydraulically, or pneumatically. The actuator piston 90 has a longitudinal centerline, LP, a first end 92, a second end 94, and sides 96. The actuator piston 90 in the embodiment shown in FIG. 6 comprises two differently shaped portions, a first portion 97 and a second portion 98. The first portion 97 of the actuator piston 90 comprises a generally cylindrical portion that extends from the first end 92 of the actuator piston to a transition area 99 between the first and second ends, 92 and 94 of the actuator piston. The second portion 98 of the actuator piston 90 comprises a frustoconical portion that extends from the transition area 99 to the second end 94 of the actuator piston. A portion 98A of the frustoconical portion at the second end 94 of the actuator piston 90 is rounded to interface with the tip 86 of the slidable member 70.

Figure 7:
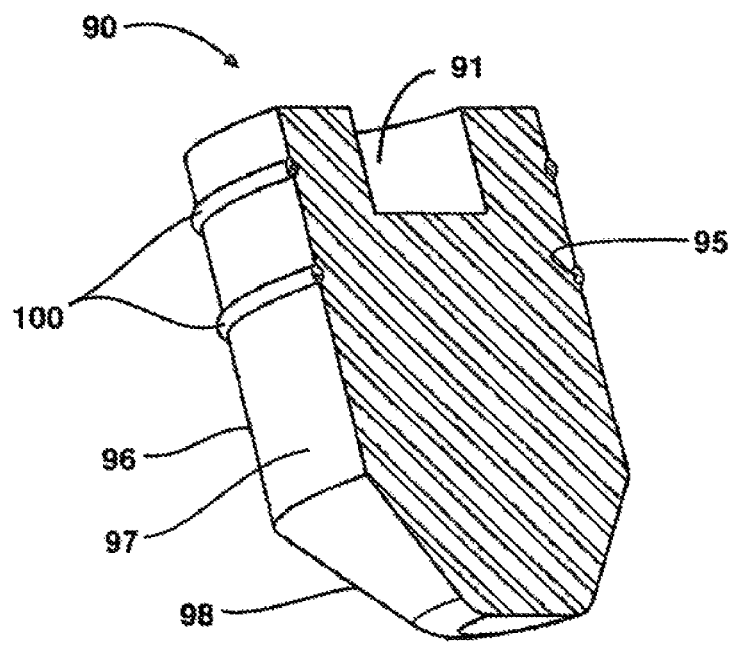
FIG. 7 is a cut away perspective view of the actuator piston shown in FIG. 6.

The first generally cylindrical portion 97 of the actuator piston 90 may have at least one circumferential recess 95 therein (shown in FIG. 7) with a seal 100 having a ring-shaped configuration (a "sealing ring") comprising at least a portion that is placed into the circumferential recess 95 and another portion extending outwardly from the recess 95. In the embodiment shown in FIGS. 6 and 7, the first portion 97 of the actuator piston 90 has a plurality of sealing rings 100 thereon. The sealing rings 100 shown in FIG. 7 are suitable for use when the actuator piston 90 is part of an actuator piston assembly (described below) where the actuator piston 90 is provided with a piston housing and the actuator piston assembly is inserted into a pipe fitting. FIG. 7 also shows that the actuator piston 90 may also have a mechanical connection opening or slot 91.

Figure 7A:
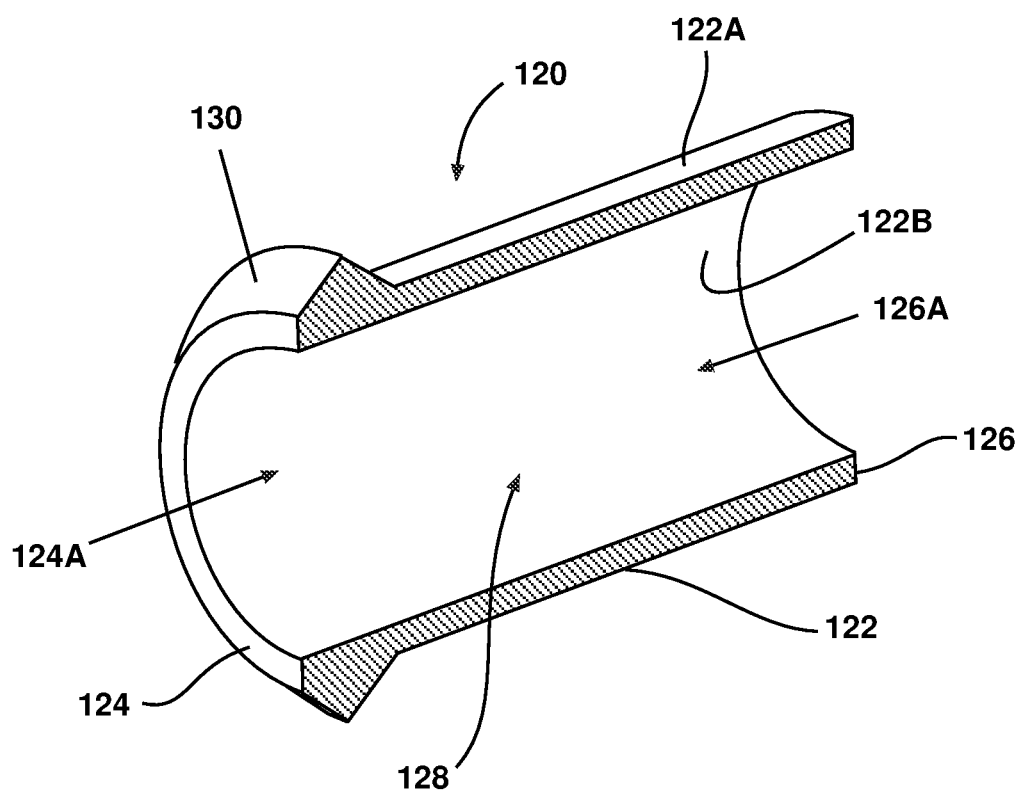
FIG. 7A is a cut away perspective view of a housing for an actuator piston.

The actuator piston 90 may comprise part of an actuator piston assembly 120 comprising a generally cylindrical piston housing 122 such as shown in FIG. 7A (without the piston 90 therein). The actuator piston 90 is intended to be inserted into pipes that form a valve body, one example of which is a tee fitting. However, the inside of the valve body may have a rough surface finish, which would interfere with the sealing and/or movement of the actuator piston 90. The insertable piston housing 122 is intended to overcome any limitations of the interior surface of the body that could be detrimental to the piston sealing or movement. The piston housing 122 has an exterior surface 122A, and interior surface 122B, a first end 124, and a second end 126. The first end 124 defines a first piston housing opening 124A, and the second end 126 defines a second piston housing opening 126A. The piston housing 122 may have a generally cylindrical exterior and an internal space 128 extending between the first and second openings 124A and 126A. The interior surface 122B defines the internal space 128. In some embodiments, the first end of the insertable piston housing 122 may comprise a flange or tapered portion 130 that projects outward from the generally cylindrical exterior of the piston housing to limit the insertion depth of the piston housing into the valve body and provide a piston sealing joint or mechanical attachment area for a piston actuator mechanism. At least a portion of the interior surface 122B of the piston housing 122 has a circular cross-section, and the actuator piston 90 is inserted into the internal space 128 in the piston housing. The piston housing 122 may have a cylindrical interior surface 122B as shown in FIG. 7A, or an interior surface with one or more steps, bores, or walls.

Figure 8:
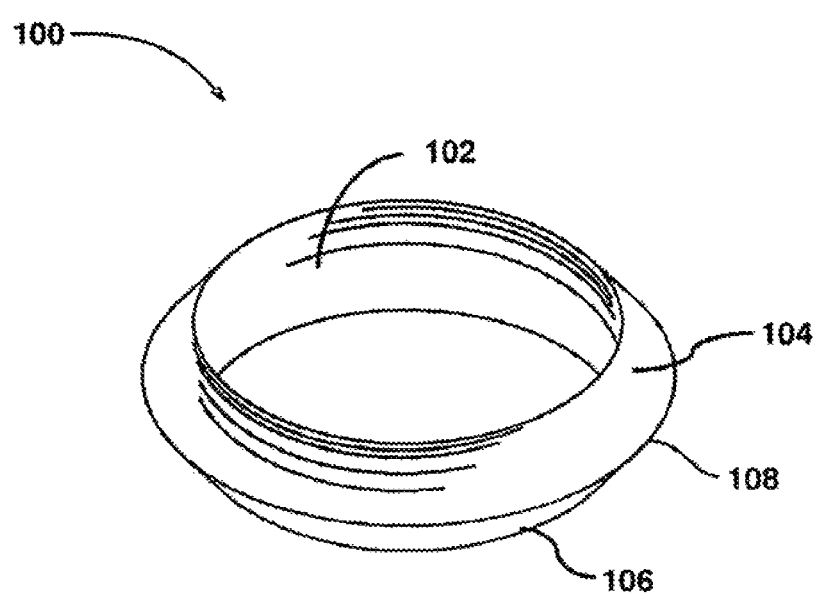
FIG. 8 is a perspective view of a piston seal.

FIG. 8 is a perspective view of an alternative embodiment of a piston seal 100. This alternative piston seal 100 comprises an inner wall 102, a first sealing end 104, a second sealing end 106 and a seal lip 108. The piston seal 100 shown in FIG. 8 is an example of a seal that can be used in a pipe fitting when the actuator piston 90 alone is inserted into the pipe fitting, and an actuator piston assembly is not used. This alternative piston seal 100 has a wider seal lip 108 to form a seal with the rough interior surface of the pipe fitting.

Figure 9:
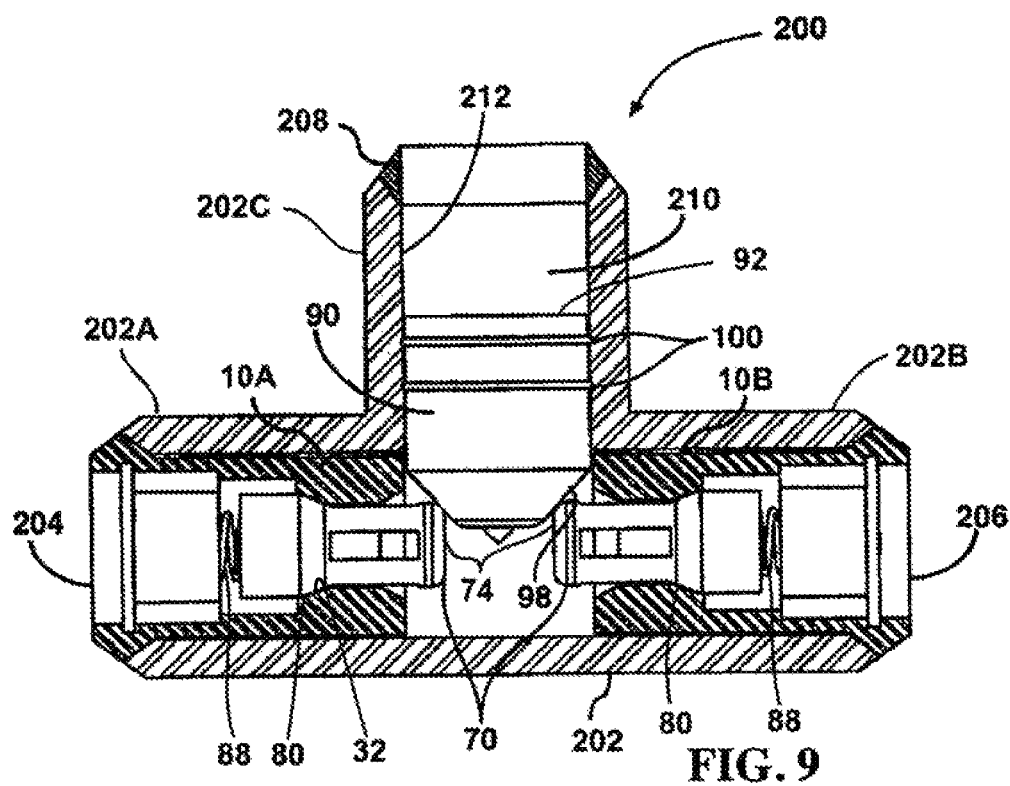
FIG. 9 is a cut away view of PACV Tee assembly with its cartridge valves in the closed position.
Figure 11:
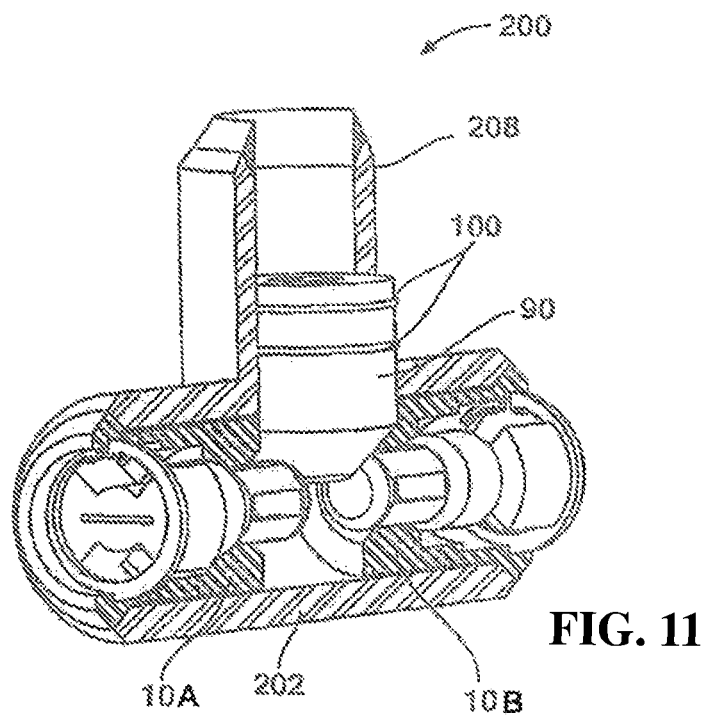
FIG. 11 is a perspective cut away view of PACV Tee assembly.

FIGS. 9-11 show a first embodiment of a piston activated cartridge valve ("PACV") Tee assembly using several of the components described above. FIGS. 9 and 11 show the piston activated cartridge valve Tee assembly 200 in the closed position. The piston activated cartridge valve Tee assembly comprises a valve body 202, an actuator piston 90 such as shown in FIG. 6, and a plurality of the cartridge valve assemblies 10A and 10B as shown in FIG. 1 that are disposed within the valve body 202.

The valve body 202 comprises three generally cylindrical tubular members (or tubular portions or branches) 202A, 202B, and 202C. The tubular members each have a proximal end where they are joined together at an intersection and a distal end that is spaced away from the intersection. The tubular members 202A, 202B, and 202C each have an outer surface, an inside surface, and a wall between their inside surface and outside surface. The tubular members have openings at their proximal ends and at their distal ends, and a typically cylindrical passageway extending between their proximal and distal ends. Two of the tubular members 202A and 202B have their axes aligned, and the third forms a branch 202C that is orthogonal to tubular members 202A and 202B. The distal ends 204 and 206 of the two tubular members in alignment 202A and 202B, respectively, can be considered to be "fluid connection ends" since they will typically be joined to pipes. The distal ends of the tubular members 202A, 202B, and 202C may have a plurality of threaded connections thereon (as in FIG. 16).

The actuator piston 90 is disposed within the branch 202C of the valve body 202. In this embodiment, the branch 202C contains actuator volume 210 which is defined by the inside surface 212 of the branch 202C and the first end 92 of the actuator piston 90 and the distal end of tubular member 202C. Once the piston 90 is installed, a variable volume for gas actuation exists depending on the position of the piston. The actuator piston 90 slides back and forth inside the branch 202C to engage with the ends 74 of the slidable members 70 and control the operation of the PACV assemblies 10A and 10B. The piston activated cartridge valves 10A and 10B are in the closed position in FIG. 9. The sealing surfaces 80 of the slidable members 70 are in contact with the third sections 32 of the inside surface 27 of the cartridge housing 20 to prevent fluid from flowing past such sealing surfaces (as described in conjunction with FIG. 5).

FIG. 10 shows the piston activated cartridge valve Tee assembly 200 in an open position. As shown in FIG. 10, when activation pressure is introduced inside of actuator volume 210 using a solenoid valve or the like, the actuator piston 90 is moved toward the intersection of the tubular members with an activation force F. The actuator piston 90 is moved toward the ends 74 of the slidable members 70 of PACV assemblies 10A and 10B that are housed within the valve body 202. When contact is made between the frustoconical actuation surface 98 of the actuator piston 90 and the tips 86 of the slidable members 70, this transmits sufficient linear forces to overcome the opposing fluid pressure located at the fluid connection ends 204 and 206 and the spring forces (exerted by the springs 88) on the slidable members 70 and pushes the slidable members 70 outward. This opens a space between the sealing surfaces 80, permitting flow between fluid connection ends 204 and 206 as shown in FIG. 10. Upon release of the force F generated on actuator piston 90, by venting the actuator volume 210, the fluid pressure at fluid connection ends 204 and 206 generate forces that are assisted by springs 88 on slidable members 70. These forces move the slidable members 70 inward until the sealing surfaces 80 are in contact with the third section (or "seat") 32 of the inside surface of the cartridge housing which stops the flow.

Figure 12:
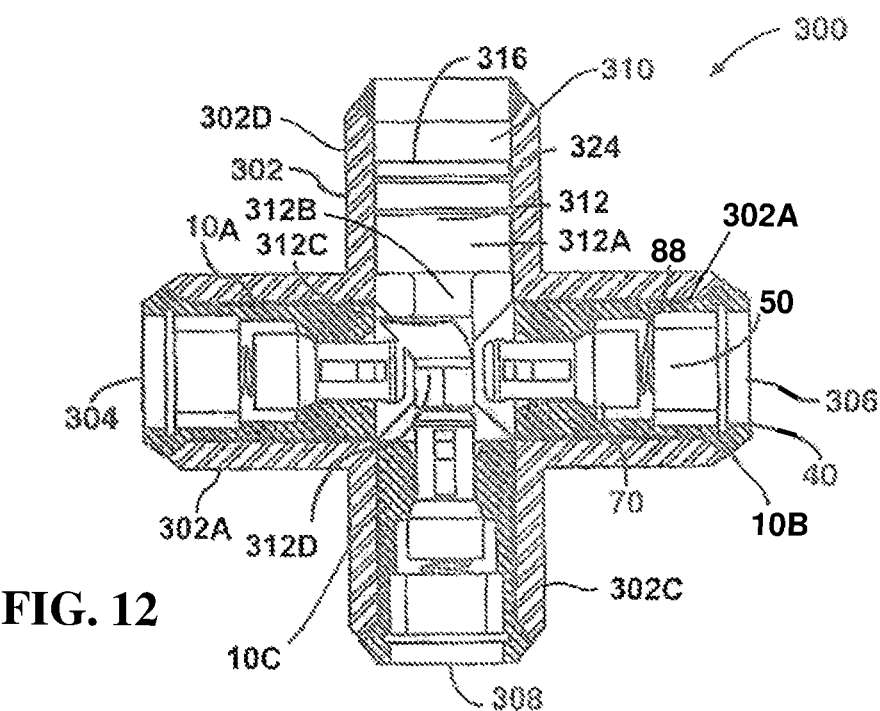
FIG. 12 is a cut away view of PACV Cross assembly with its cartridge valves in the closed position.

FIG. 12 shows a piston activated cartridge valve cross assembly 300 in the closed position. The piston activated cartridge valve cross assembly 300 is comprised of a valve body 302. The valve body 302 comprises four generally cylindrical tubular members (or tubular portions or branches) 302A, 302B, 302C, and 302D. The tubular members each have a proximal end where they are joined together at an intersection and a distal end that is spaced away from the intersection. The tubular members 302A, 302B, 302C, and 302D each have an outer surface, an inside surface, and a wall between their inside surface and outside surface. The tubular members have openings at their proximal ends and at their distal ends, and a typically cylindrical passageway extending between their proximal and distal ends. Tubular members 302A and 302B have their axes aligned. Tubular members 302C and 302D have their axes aligned and are orthogonal to tubular members 302A and 302B. The valve body 302 has a first fluid connection end 304 and a second fluid connection end 306 on the opposite side thereof. A third fluid connection end 308 extends downward, and an actuator connection end 310 extends upward between the first and second connection ends 304, 306. It should be understood that the terms up, down, left, right or other similar directional descriptors are related to the views shown in the drawings and do not define absolute directions in any other sense. In one embodiment, fluid connection end 304 can be connected to a main fluid circuit, fluid connection end 306 can be connected to a discharge, and fluid connection end 308 can be connected to a purge source.

The cross assembly 300 comprises a plurality of the cartridge valve assemblies 10A, 10B, and 10C as shown in FIG. 1 that are disposed within the valve body 302. The piston activated cartridge valve cross assembly 300 shown in FIG. 12 also comprises an actuator piston 312 shown in greater detail in FIG. 15. The actuator piston 312 is disposed within the fourth branch 302D of the valve body 302. The actuator piston 312 has a longitudinal centerline, a first end 316, and a second end 320. The actuator piston 312 comprises four portions having differing configurations. These comprise a first cylindrical portion 312A, a second stem portion 312B, a third partial frustoconical portion 312C, and a fourth portion with elliptical sides 312D when viewed from the end.

Figure 13:
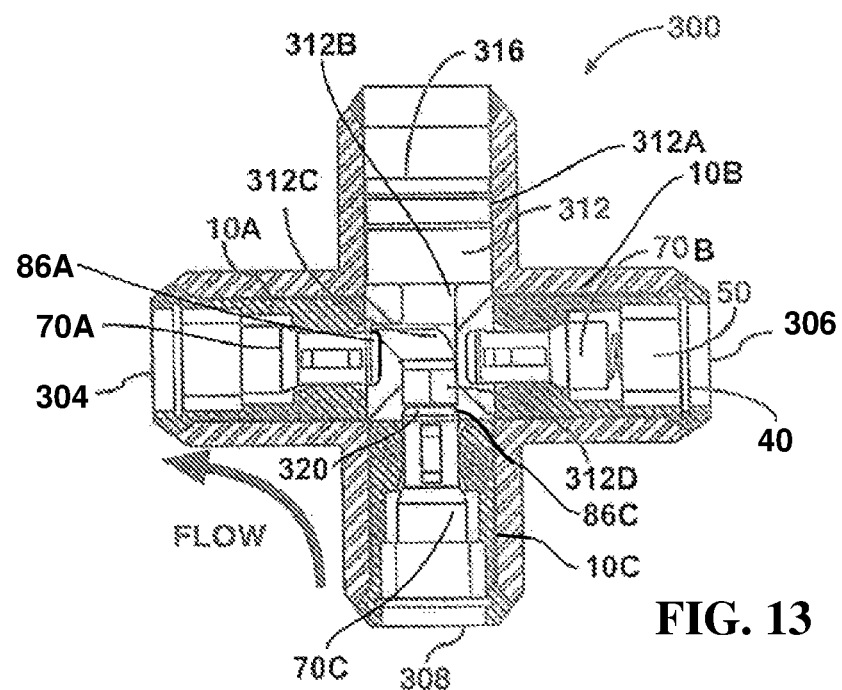
FIG. 13 is a cut away view of PACV Cross assembly where two of the fluid connection ends are in the open position.

FIG. 13 shows the piston activated cartridge valve cross assembly 300 of FIG. 12 when the fluid connection ends 304 and 308 are in the open position. The actuator piston 312 utilizes the second end 320 thereof, and the third partial frustoconical portion 312C to control the operation of a plurality of PACV assemblies 10A, 10B, and 10C housed within valve body 302. To achieve the motion needed to operate a plurality of PACV assemblies 10 housed with valve body 302, the actuator piston 312 utilizes a mechanical actuator stem (not shown) which can provide both linear and rotational motion. FIG. 12 represents the closed position for the PACV cross assembly 300, and the fluid connection end 304, fluid connection end 306, and fluid connection end 308. When the valve is inactive, all fluid circuits are isolated. As shown in FIG. 13, to allow flow between fluid connections 304 and 308, the actuator piston 312 is operated in a linear motion ensuring that second end 320 contacts and transfers further motion to slidable member 70C tip 86C on fluid connection 308 while third partial frustoconical portion 312C simultaneously contacts and transfers further motion to slidable member 70A tip 86A on fluid connection 304. To stop flow between fluid connection 304 and 308, actuator piston 312 forces are sufficiently removed allowing purge source connected to fluid connection 308 to close slidable member 70C and main fluid circuit connected to fluid connection 304 to close slidable member 70A.

Figure 14:
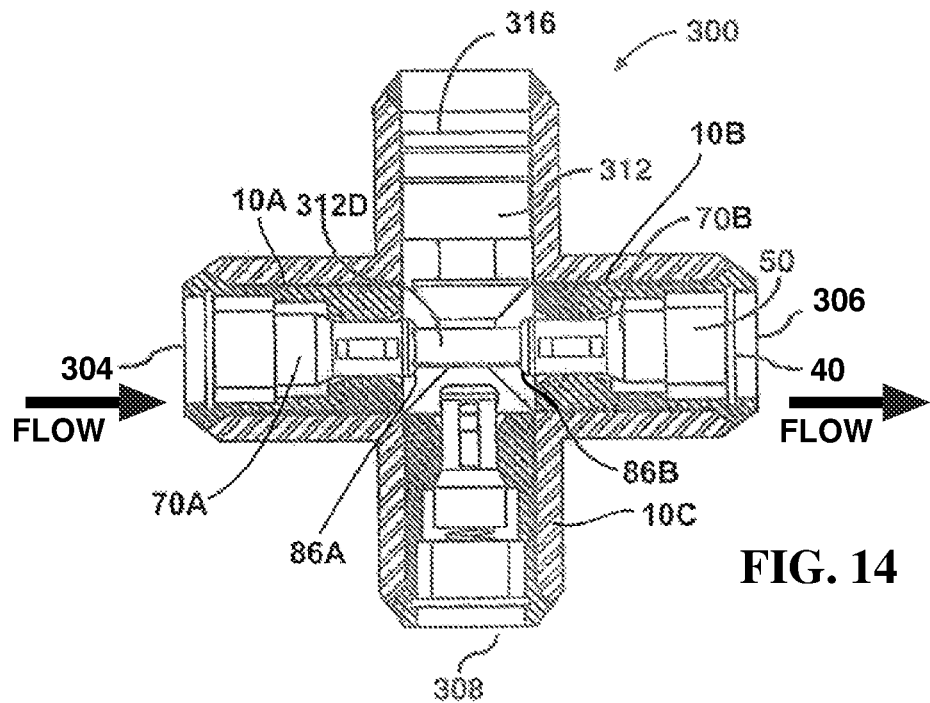
FIG. 14 is a cut away view of PACV Cross assembly where two different fluid connection ends are in the open position.

FIG. 14 shows the PACV cross assembly 300 where fluid connection ends 304 and 306 are in the open position. Referring to FIG. 14, to allow flow from fluid connection 304 and 306, actuator piston 312 is operated with rotational motion ensuring that the fourth portion with elliptical sides 312D contacts and transfers further motion to slidable member 70B tip 86B on fluid connection 306 while simultaneously contacting and transferring motion to slidable member 70A tip 86A on fluid connection 304. To stop flow between fluid connection 304 and 306, actuator piston 312 forces are sufficiently removed allowing the discharge connected to fluid connection 306 to close slidable member 70B and the main fluid circuit connected to fluid connection 304 to close slidable member 70A.

Figure 15:
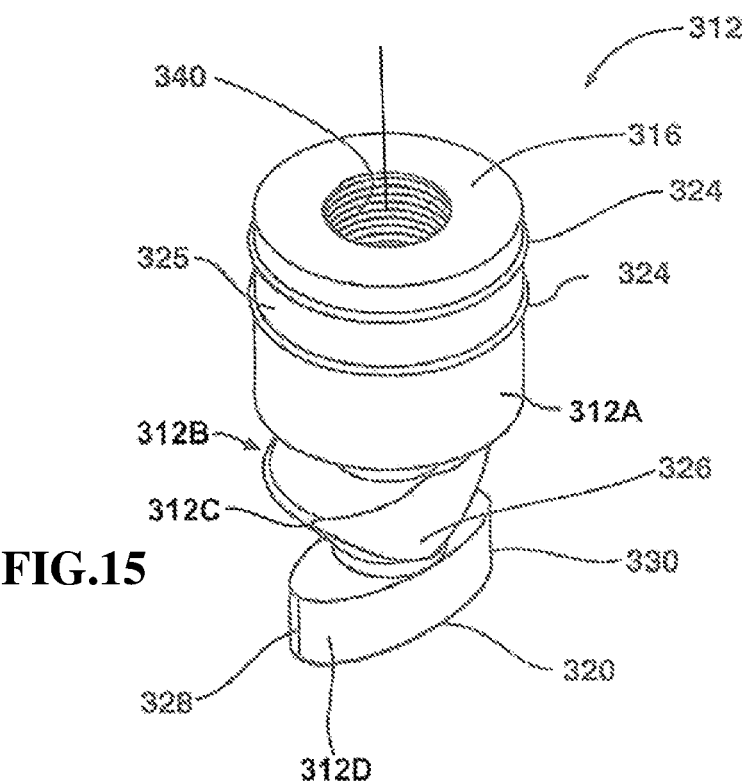
FIG. 15 is a perspective view of an actuator piston for the PACV Cross assembly.

FIG. 15 shows the embodiment of the actuator piston 312 that is particularly useful in a cross-shaped valve body. The first portion 312A comprises a generally cylindrical portion at the first end 316 of the actuator piston 312. The first portion 312A has an outer surface 325 with one or more seals 324 thereon. A piston head connecting feature, such as a recess with internal threads 340 can be provided at the first end 316 of the piston 312. The second portion 312B comprises a stem that connects the first portion 312A to the third portion 312C. The third portion 312C comprises a partial frustoconical portion. One side 326 of the frustoconical portion is configured (e.g., machined away) so that no portion of the partial frustoconical third portion 312C extends beyond one side of the fourth portion 312D. The fourth portion 312D has a generally elliptical cross-section, and is located at the second end 320 of the actuator piston 312. The fourth portion 312D has an outer surface with two sides with a larger radius of curvature and two ends 328 and 330 with a smaller radius of curvature. The actuator piston 312 shown in FIG. 15 is unique in that the partial frustoconical third portion 312C creates clearance during movement, and is used in conjunction with the end of the generally ellipsoidal end fourth portion 312D to provide the activating means (by linear motion) for one flow path; and the sides of the generally ellipsoidal fourth portion 312D are used alone without the frustoconical third portion 312C to provide the activating means (by rotary motion) for another flow path.

Figure 16:
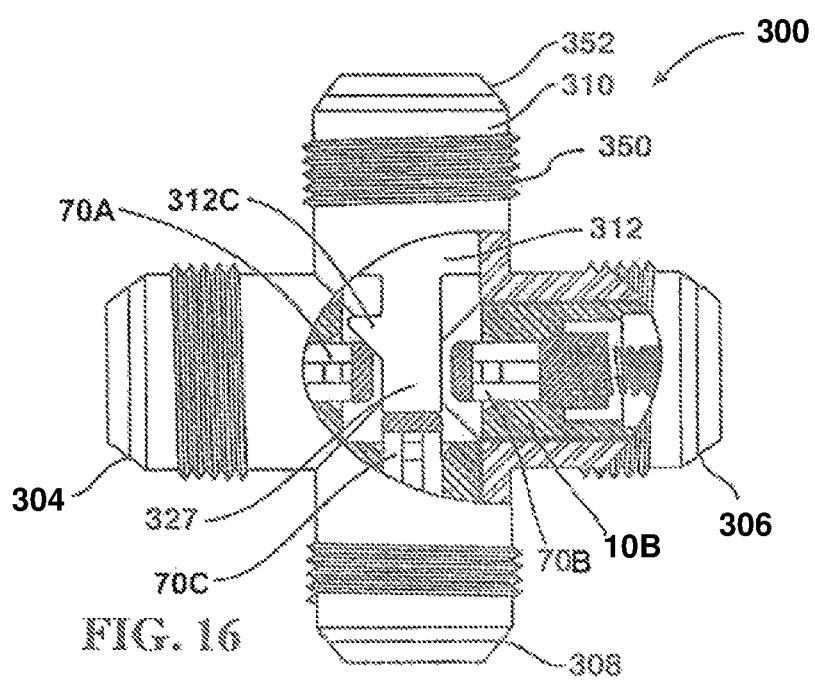
FIG. 16 is a cut away view of PACV Cross assembly where a plurality of threaded connections and sealing ends are shown.
Figure 17:
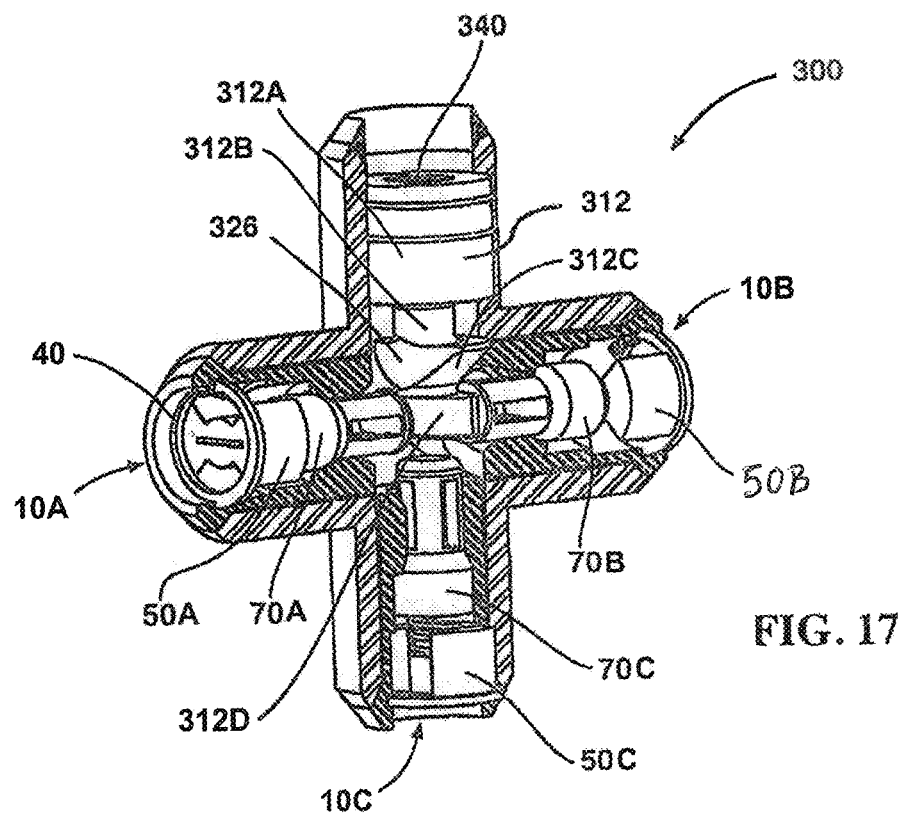
FIG. 17 is a perspective cut away view of PACV Cross assembly.

Referring now to FIGS. 16 and 17, cutaway and cutaway perspective views of the PACV cross assembly 300 show a portion of the internal components such as the PACV assemblies 10A, 10B, and 10C; retaining member 40; stops 50A, 50B, and 50C; slides 70A, 70B, and 70C; piston 312, and the first portion 312A, second portion 312B, third portion 312C, and fourth portion 312D thereof. FIG. 16 shows that each of the connecting ends 304, 306, 308 and 310 can include threaded portions 350 and an angled sealing surface 352 such as standard thirty-seven degree, forty-five degree or similar type of flare joint connection. It should be understood that the connecting ends may use other means to seal and connect with a fluid conduit. By way of example and not limitation, clamp means, welding, brazing, bolted flange and/or other mechanical means may be used as one skilled in the art would readily understand.

Figure 18:
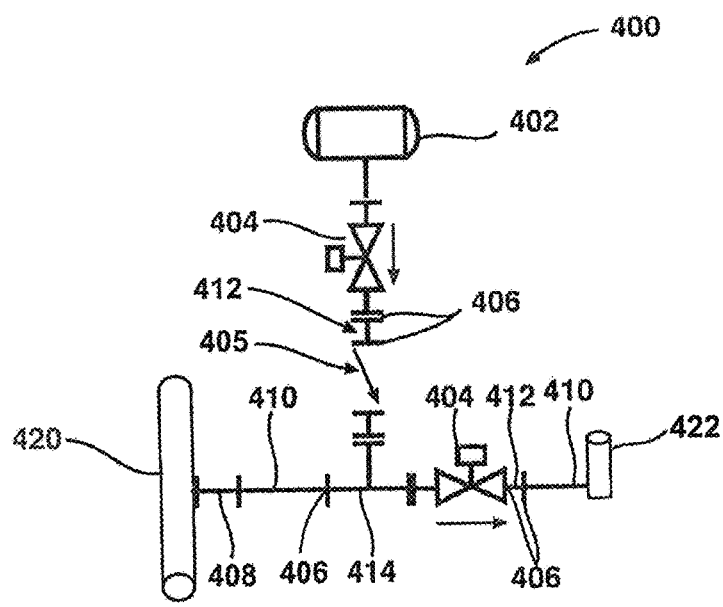
FIG. 18 is a schematic piping diagram of a conventional fluid circuit used to apply a purge source to a main fluid circuit as well as allow main fluid circuit contents to be released through discharge.

Referring now to FIG. 18, a schematic diagram of a conventional fluid circuit 400 is depicted. A typical fluid joint 406 is used to connect valves, fittings, check valves and tubing. The fluid circuit 400 includes a purge source 402 with a conventional valve 404 fluidly connected thereto coupled with a check valve 405. A tube 410 extends from a tee fitting 414 to connect with a main fluid circuit 420 coupled with fitting 408. Another conventional valve 404 connects to tee 414 and fitting 412 and is fluidly connected to the tube 410 upstream of the discharge line 422. The schematic piping diagram for the conventional fluid circuit 400 shows that this circuit is composed of multiple fittings shown as 408, 412, and 414. Also, the conventional fluid circuit 400 has numerous typical fluid joints 406.

Figure 19:
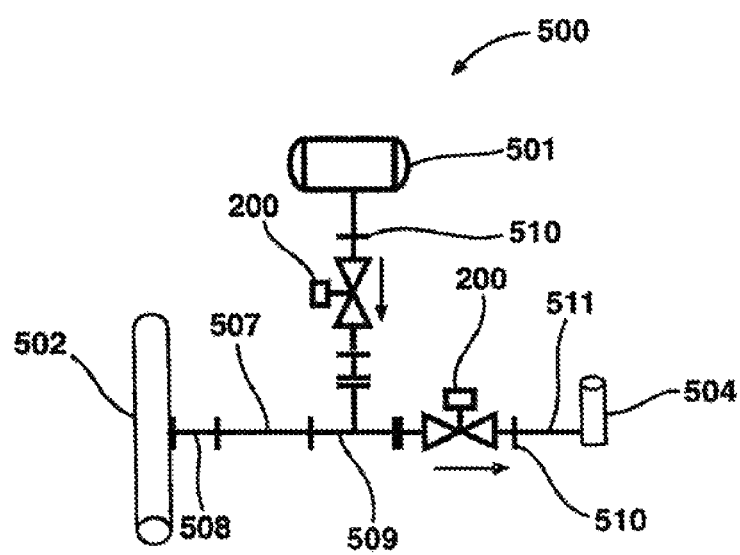
FIG. 19 is a schematic piping diagram of the fluid circuit shown in FIG. 18 fitted with PACV Tee components.

FIG. 19 is a schematic diagram of a novel fluid circuit 500 similar to the fluid circuit 400 shown in FIG. 18. The fluid circuit 500 comprises a purge source 501, main fluid circuit 502, discharge line 504, and conduits 507 and 511. A typical fluid joint 510 is used to connect valves, fittings, check valves and tubing. However, the novel fluid circuit 500 includes PACV tee assemblies 200 that replace the conventional valves and associated connecting joints. Each of the PACV tee assemblies 200 comprises an integral joint 510 that connects the PACV tee assemblies 200 to conduits within fluid circuit 500. The PACV Tee equipped fluid circuit 500 comprises two fittings shown as 508 and 509. Also, the PACV Tee equipped fluid circuit 500 has seven joints shown typically as 510. This represents a significant reduction in the number of fittings and joints as compared to a conventional fluid circuit 400 shown in FIG. 18.

Figure 20:
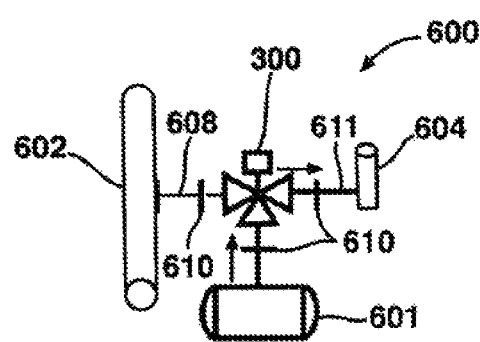
FIG. 20 is a schematic piping diagram of the fluid circuit shown in FIG. 18 fitted with PACV Cross component.

FIG. 20 is schematic diagram of a novel fluid circuit 600 with purge source 601, main fluid circuit 602, discharge line 604, and conduits 608 and 611. However, a PACV cross assembly 300 replaces the conventional valves and connecting joints. Integral joints 610 connect the PACV 600 to conduits in the circuit 600. The PACV Cross 300 has one fitting and four joints. This represents a substantial reduction in the number of fittings and joints as compared to a conventional fluid circuit 400.

Various alternative embodiments of the valves, the components used to create valves, the system, and the various fluid circuits that can be created using the insertable devices described herein are possible.

Figure 21:
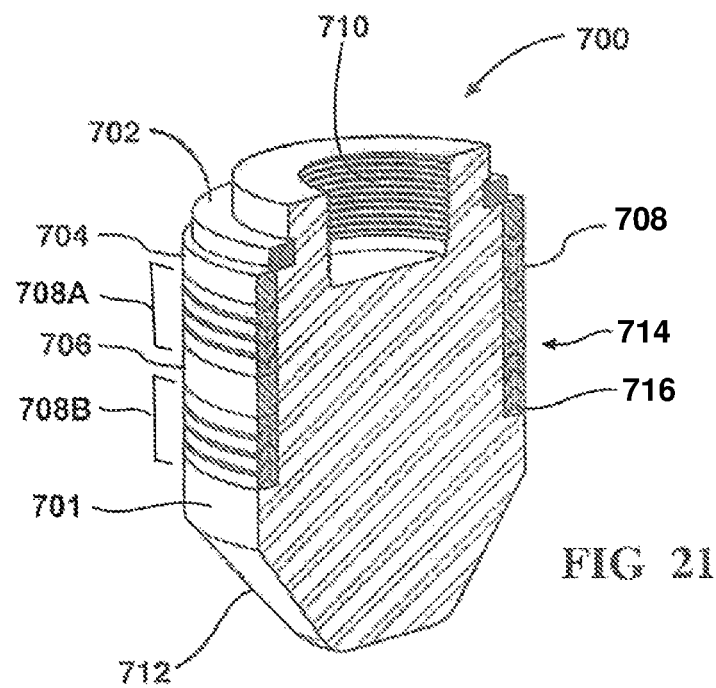
FIG. 21 is an alternative embodiment of an actuator piston.

Numerous alternative embodiments of the actuator piston are possible. FIG. 21 shows an alternative embodiment of an actuator piston 700 that has a more extensive sealing mechanism. The actuator piston 700 shown in FIG. 21 has a similar configuration to the actuator piston shown in FIGS. 6 and 7.

The actuator piston 700 comprises a first cylindrical portion 701. A frustoconical second portion with an actuation surface 712 is formed at the other end of the piston 700. A connecting feature 710 that may include interface threads or the like for an actuation member to connect to the piston 700 is provided. FIG. 21 shows that the first portion 701 of the actuator piston 700 has a recessed region 714 around its circumference. The recessed region 714 forms a shelf 716 on the sides of the actuator piston 700. A plurality of ring-shaped directional seals 708 having a chevron-shaped cross-sectional configuration rest on top of this shelf 716. The directional seals 708 shown are arranged into two groups 708A and 708B, each comprising a plurality of seals. The first group 708A has the pointed end of their chevron-shaped cross-sections oriented downward in FIG. 21, and the second group 708B has the pointed end of their chevron-shaped cross-sections oriented upward. The two groups of directional seals 708 are separated by a spacer 706. The directional seals 708 are held in position by a ring 704 and a piston clip 702.

Figure 22:
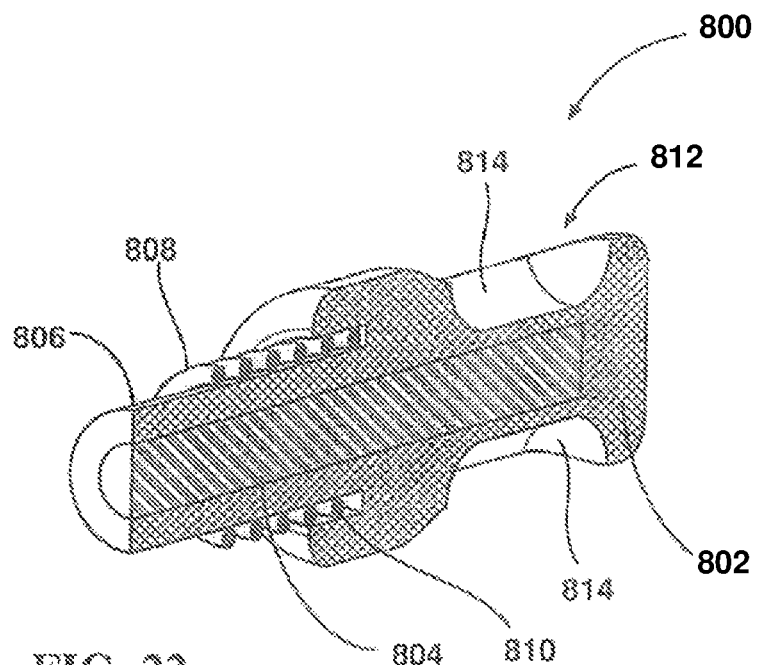
FIG. 22 is an alternative embodiment of slidable member.

FIG. 22 depicts an alternate embodiment of a slidable member 800. The slidable member 800 includes a body 802 that may be formed of a composite material in some forms to provide a lighter and/or a wear resistant slidable member. A stiffening member 804 may be positioned within the body 802 to strengthen the slidable member 800. The stiffening member 804 may be formed from a metal, a metal alloy, a composite, a ceramic, or other similar materials. The body 802 includes an extended tail 806 constructed to permit a spring 808 to engage around a perimeter thereof. A spring groove 810 is formed between the tail 806 and an outer portion of the body 802. The spring 808 fits around the extended tail 806 and into the spring groove 810. A cylinder 812 includes flow channels 814 formed therein to permit a fluid flow therethrough when the slide is moved to an open position similar to the previous embodiments discussed above.

Figure 23:
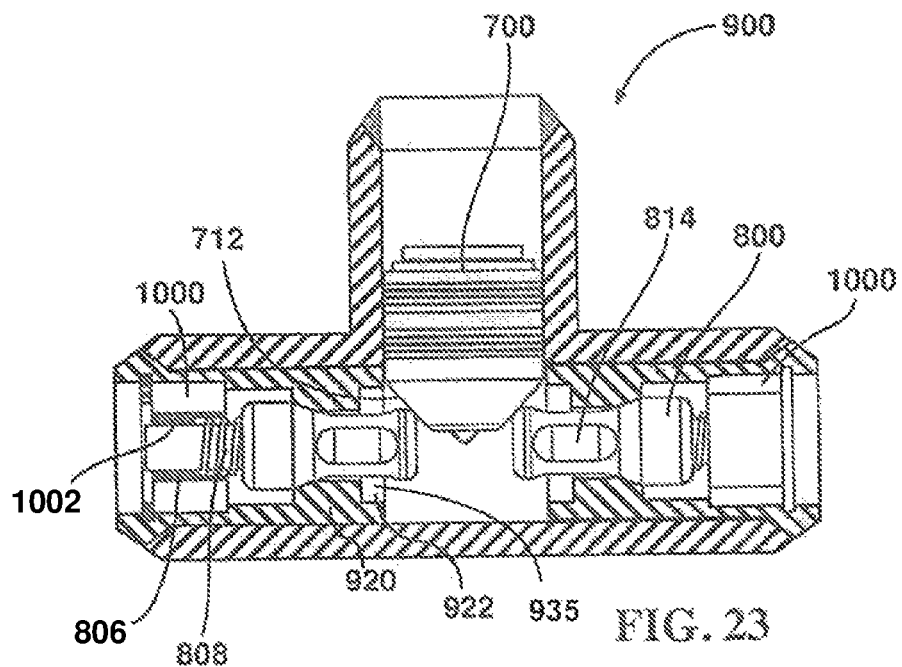
FIG. 23 is a cut away view of alternative embodiment of PACV Tee assembly depicting the inserting of extended tail into the stop.
Figure 24:
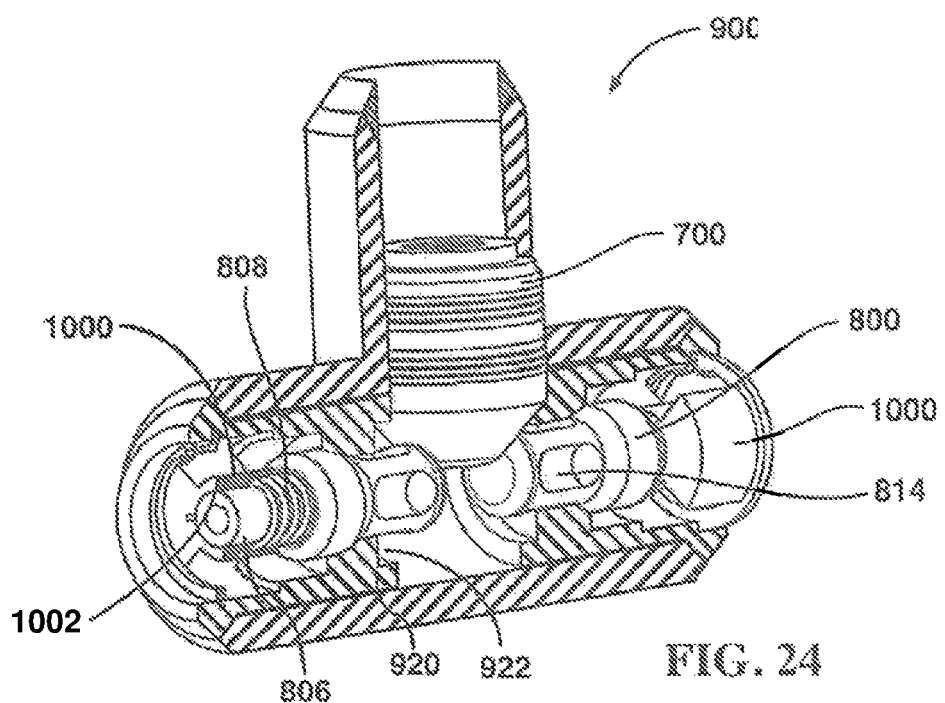
FIG. 24 is a perspective view of the alternative embodiment PACV Tee assembly shown in FIG. 23.

Referring now to FIGS. 23 and 24, cross-sectional cutaway views of a PACV tee assembly 900 according to another embodiment is shown. The PACV tee assembly 900 operates substantially similarly to previous embodiments described above however, the alternate piston 700 and alternate slidable member 800 is assembled therewith. A stop 1000 operates substantially similar to the stop 50 shown in FIGS. 1 and 3, however the design is modified to include an internal bore 1002 formed therein to receive insertion of the extended tail 806 and the spring 808 of the slidable member 800. Cartridge housing 920 has alternative embodiment taper 935 that is indicated by deeper recess 922.

Figure 25:
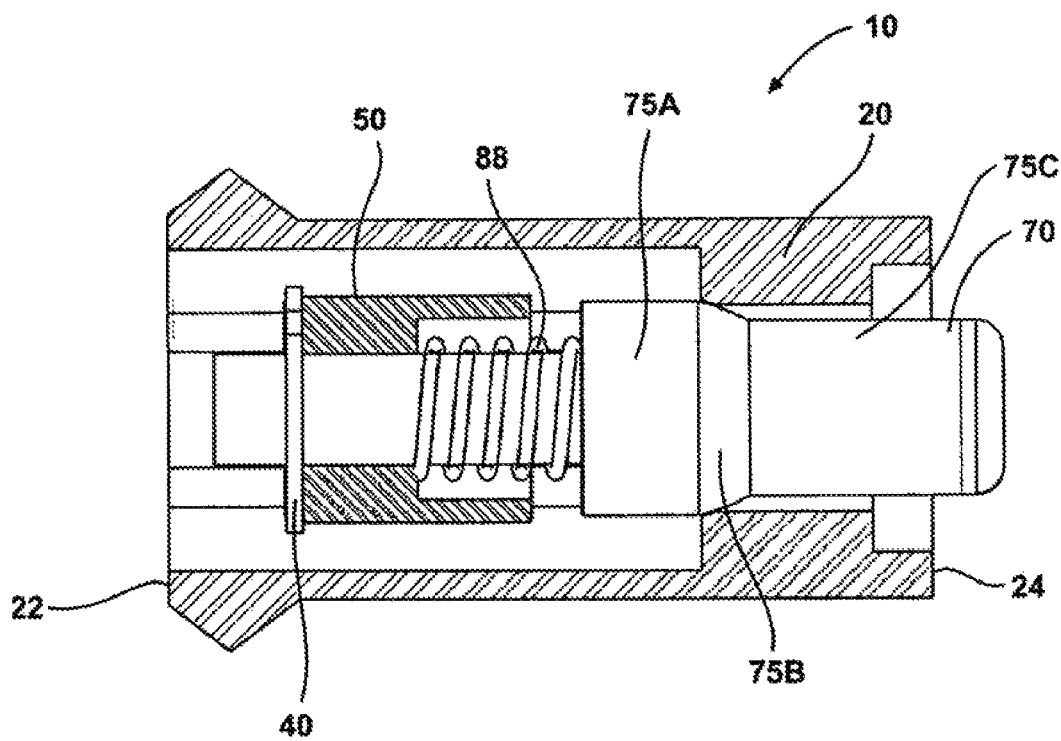
FIG. 25 is a cut away side view of an alternative cartridge valve assembly having a stop as shown in FIG. 3A and a slidable member with an extended tail.
Figure 26:
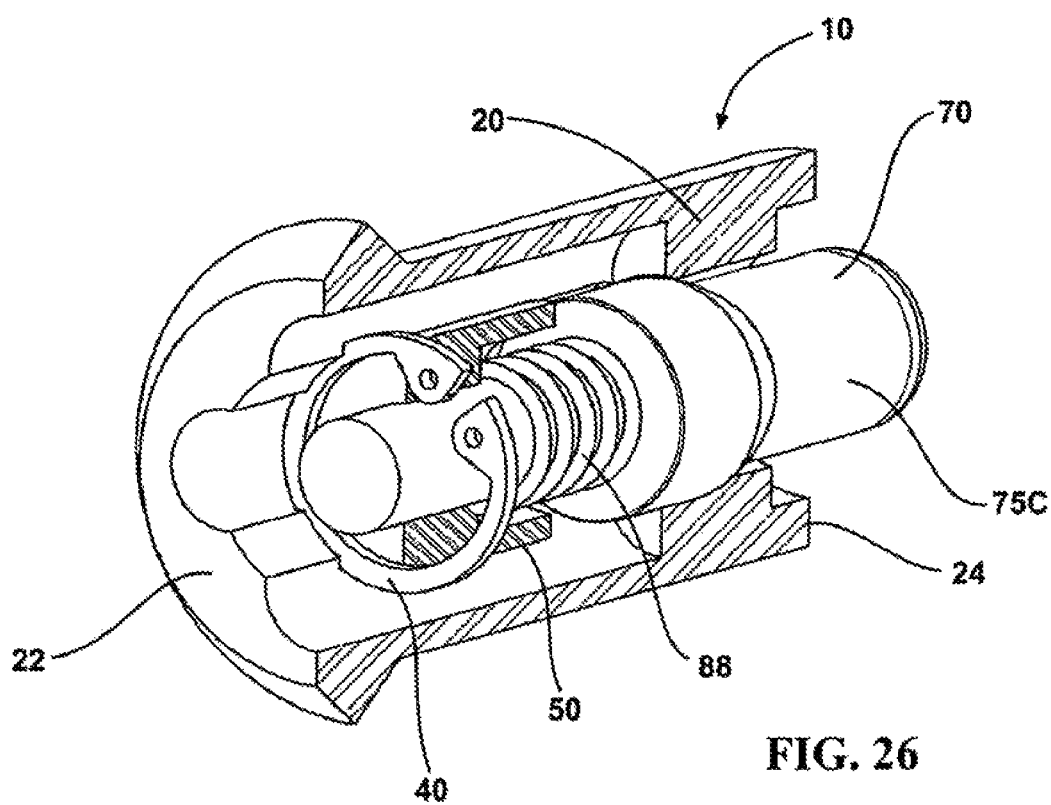
FIG. 26 is a cut away perspective view of the cartridge valve assembly shown in FIG. 25.

FIGS. 25 and 26 show an alternative cartridge valve assembly 20 having a stop 50 as shown in FIG. 3A and a slidable member 70 with an extended tail. The second portion 75C of the slidable member 70 does not have flow channels therein.

The slidable member 70 can comprise a single component as shown in FIGS. 1, 4, and 5. In other embodiments, as shown in FIGS. 27 and 28, the slidable member 1070 may comprise a plurality of separate parts positioned adjacent to each other along the longitudinal centerline L of the cartridge valve assembly 10. In this embodiment, the stop 50 is in the configuration of a relatively thin washer having the ability to retain the spring 88. FIGS. 27 and 28 show that the parts of the slidable member 1070 (as well as the interior surface of the cartridge housing 20) are also not limited to cylindrical configurations, and may have various different shapes. For instance as shown in FIGS. 27 and 28, the slidable member 1070 comprises a first component and a second component, wherein the first and second components may be in contact with one another, but are not joined together. In the embodiment shown, the first component 1070A has a generally spherical configuration. The second component 1070B of the slidable member 1070 comprises a generally cylindrical member having a first end (closest to the spherical component) with a hemi-spherical configuration and a second end with rounded edges around its circumference. Thus, the first portion of slide, intermediate portion and second portion of slidable member previously described are located on different components that are in contact with one another. The housing 20 comprises an interior surface with: a first section having a cross section which has channels therein; a second section 32 that provides a curved sealing surface; and a third section that has channels therein. In order to keep the second component 1070B of the slidable member 1070 from falling out the end 24 of the housing, during assembly the technician would need to properly orient and insert the first cartridge assembly in the body (Tee/Cross), then insert the actuator piston in the body, and then insert the final cartridge assembly. Once fully assembled, the complete valve body assembly would retain all devices in place.

Figure 29:
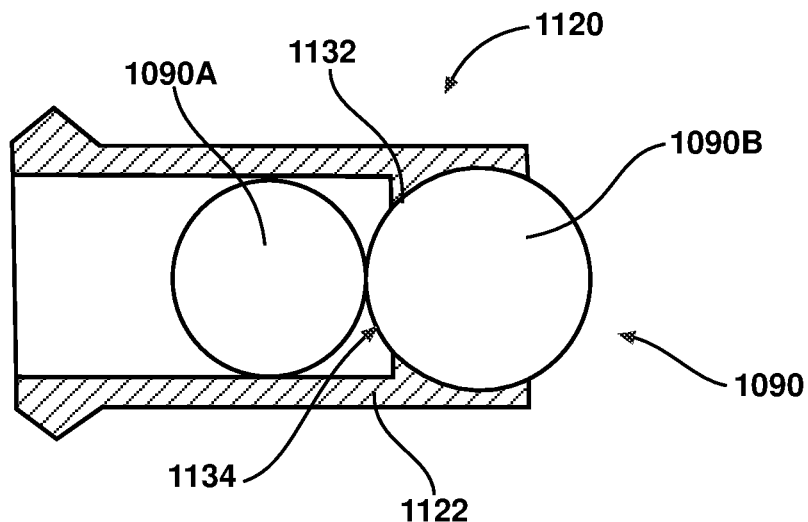
FIG. 29 is a cut away side view of an alternative insertable actuator piston assembly in which the piston comprises multiple components.
Figure 30:
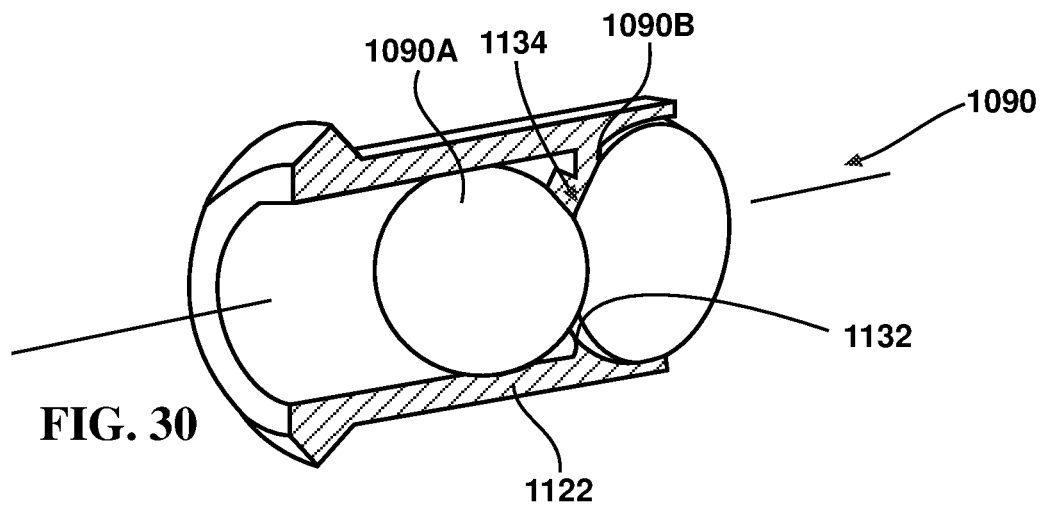
FIG. 30 is a cut away perspective view of the actuator piston assembly shown in FIG. 29.
Figure 31:
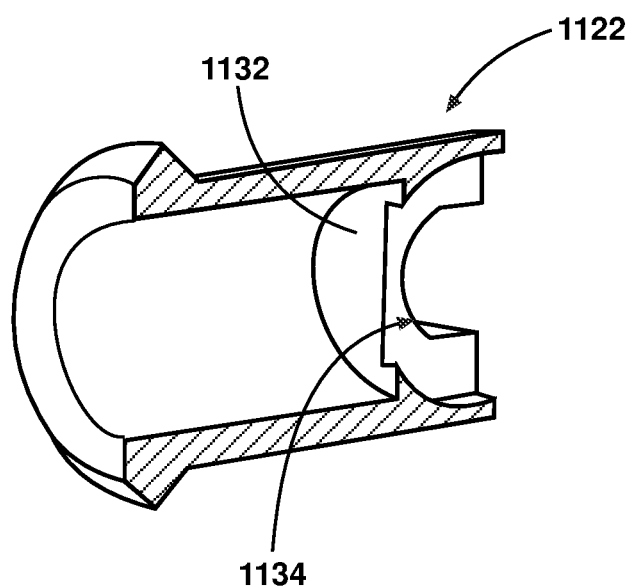
FIG. 31 is a cut away perspective view of the actuator piston housing shown in FIG. 29 without the piston therein.

FIGS. 29 and 30 show an alternative actuator piston assembly. The actuator piston 1090 in FIGS. 29 and 30 has different portions comprising the actuator piston that are separated, rather than being joined together as in the previous embodiments. For example, in the actuator piston assembly 1120, the actuator piston 1090 may comprise a piston housing 1122 that contains a first (or "inner") piston component 1090A and a second outer piston component (or "activating component") 1090B. The first or inner piston component 1090A may have several possible configurations, provided that its contact surface (that is, the portion of the first piston component that is closest to, and interfaces with, the activating component) 1090B is configured to protrude through a central opening in the piston housing 1122 so that it can push the activating component 1090B in order to move the activating component 1090B. The first piston component 1090A may, for example, be spherical, or cylindrical with a hemi-spherical end. The activating component 1090B may also have several possible configurations including, but not limited to frustoconical and disk-shaped. In the embodiment shown the inner piston component 1090A is spherical and the activating component 1090B is disk-shaped. The disk-shaped activating component 1090B is oriented so that the flat sides of the disk are parallel to the longitudinal centerline of the piston housing. This combination of configurations provides a curvilinear contact surfaces between the inner piston component and the activating component. The components of the actuator piston are held in place by a divider wall 1132 having an opening 1134 in the center that allows contact between the spherical piston component 1090A and the disk-shaped, activating component 1090B. FIG. 31 shows that the divider wall 1132 may have a flat side facing the spherical piston component 1090A, and a spherical cup-shaped side facing the disk-shaped, activating component 1090B. The disk-shaped, activating component 1090B may be held in place in the piston housing 1122 upon assembly and insertion of these components into a valve body. Alternatively, the activating component 1090B may be joined to the inner piston component 1090A by a spring.

FIGS. 32-40 are non-limiting examples showing that the PACV Tee and cross components can act as multiple sets of valves encased within a single valve body. Each cartridge valve assembly has the ability to be normally closed by the incoming or outgoing fluid pressure. The cartridge valve assemblies can function as both a valve when the activated by an actuator piston, and as a passive check valve when deactivated when no force is applied to the slidable member by the actuator piston. In some cases, the actuation piston can be removed. This compaction of component functionality significantly reduces the complexity, the number of fittings and joints associated with a typical fluid circuit.

Figure 32:
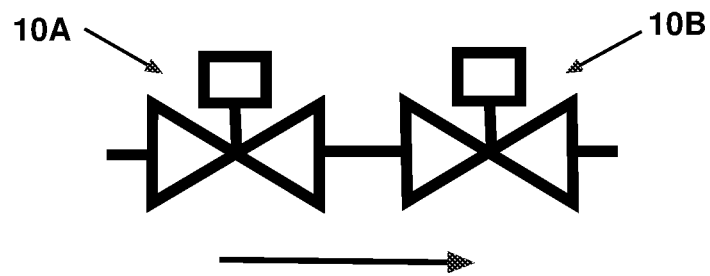
FIG. 32 is a schematic diagram using traditional graphical symbols of a piston activated cartridge valve Tee assembly in which two cartridge valve assemblies are provided both of which are in open position to permit flow of fluid through the cartridge valve assemblies.

FIG. 32 shows a PACV Tee configuration where the cartridge valve assemblies 10A and 10B are disposed within the valve body and the actuation piston contacts the two slidable members of the cartridge valve assemblies, and fluid flows through both PACV's. This is similar to the embodiment shown in FIG. 10. (The rectangular symbol on top of the cartridge valve assemblies is a graphical symbol for an actuator device.)

Figure 33:
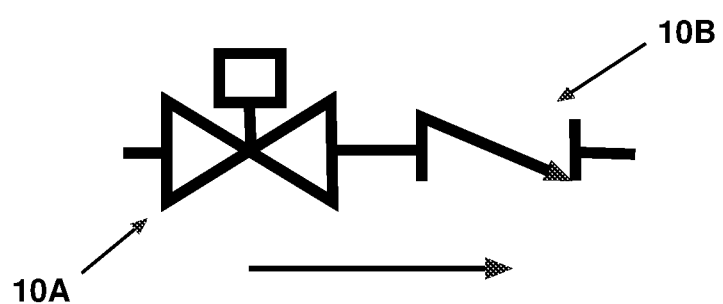
FIG. 33 is a schematic diagram of another piston activated cartridge valve Tee assembly in which two cartridge valve assemblies are provided, and one cartridge valve assembly functions as a valve, and the other functions as a passive check valve.

FIG. 33 shows a PACV Tee configuration where one PACV 10A is opened with the actuation piston and upon actuation, the other PACV 10B has sufficient differential pressure to open and function as a passive check valve when actuation piston force is removed from the first PACV slidable member. This requires a truncated frustoconical and mechanical coupling actuator or other device that keeps the actuation piston in alignment.

Figure 34:
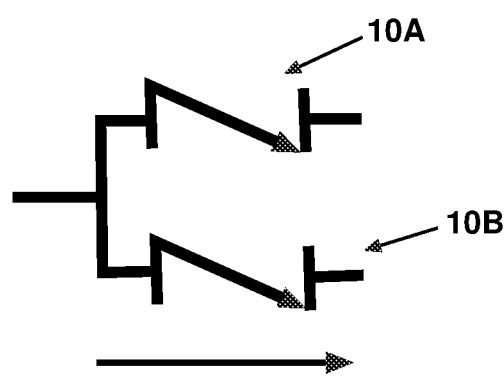
FIG. 34 is a schematic diagram of a cartridge valve Tee assembly in which two cartridge valve assemblies are provided, and both function as passive check valves.

FIG. 34 shows a PACV Tee configuration where two PACV's 10A and 10B are installed but the actuation piston is removed and replaced with a connection to a fluid supply valve (not shown). When the fluid supply valve is opened, and the PACV has sufficient pressure differential to operate, fluid will flow across the branch PACV (which, with the piston removed may be considered to be a passive PACV). When the fluid supply valve is closed, the pressure decays and PACV spring force closes the slidable members like a passive check valve.

Figure 35:
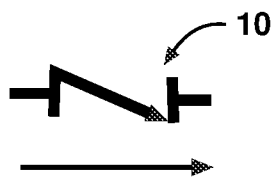
FIG. 35 is a schematic diagram of another cartridge valve Tee assembly in which one cartridge valve assembly is provided and functions as a passive check valve.

FIG. 35 shows a PACV Tee configuration where one PACV 10 is installed but the actuation piston is removed and fluid supply valve (not shown) delivers sufficient pressure differential to have the PACV act as a passive check valve.

Figure 36:
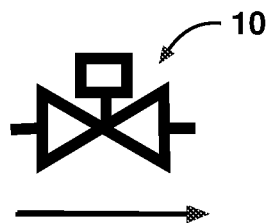
FIG. 36 is a schematic diagram of another piston activated cartridge valve Tee assembly in which one cartridge valve assembly is provided and functions as a valve.

FIG. 36 shows a PACV Tee configuration where one PACV 10 is installed and where actuation piston contacts the one slidable member and fluid flows through the single PACV.

Figure 37:
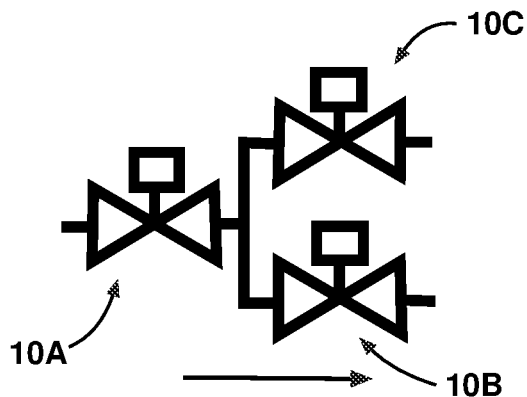
FIG. 37 is a schematic diagram of a piston activated cartridge valve cross assembly with a dual actuation piston.

FIG. 37 shows a PACV cross configuration where the dual actuation piston capable of both rotary and linear motion opens a combination of PACV's. With linear motion, the first PACV 10A and one of the branch PACV's 10B are actuated and fluid flows through the path which is actuated open. With rotary motion, the two branch PACV's 10B and 10C are actuated open and fluid flows through this path. PACV spring forces and pressure differential assist keep the inactive PACV 10C path closed.

Figure 38:
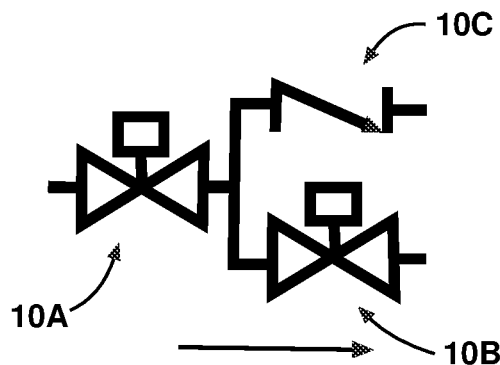
FIG. 38 is a schematic diagram of another piston activated cartridge valve cross assembly with a dual actuation piston where one of the cartridge valve assemblies is acting as a passive check valve.

FIG. 38 shows a PACV cross configuration where the dual actuation piston uses either rotary or linear motion to contact the first PACV 10A and one of the branch PACV's 10B and fluid flows through the path which is actuated open. The remaining branch PACV 10C using spring force and pressure differential acts as a passive check valve device.

Figure 39:
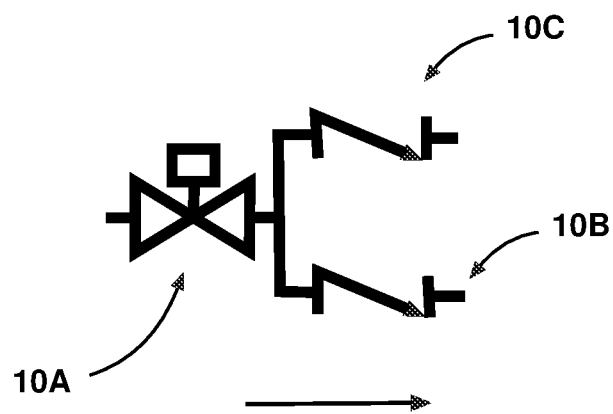
FIG. 39 is a schematic diagram of another piston activated cartridge valve cross assembly in which one piston activated valve acts as a valve, and the other piston activated valves act as passive check valves.

FIG. 39 shows a PACV cross configuration where the first PACV 10A is activated by linear or rotary motion and both branch PACV's 10B and 10C use spring force and pressure differential to act as passive check valve devices.

Figure 40:
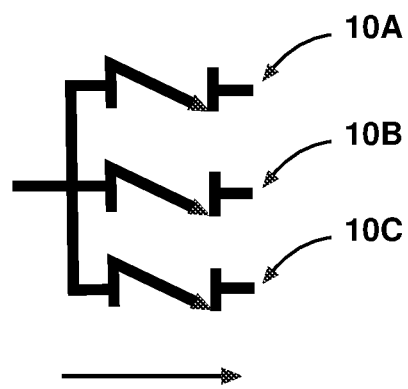
FIG. 40 is a schematic diagram of another cartridge valve cross assembly in which three cartridge valve assemblies are provided that function as passive check valves.

FIG. 40 shows a PACV cross configuration where three PACV's 10A, 10B, and 10C are installed in the branches of the cross but the actuation piston is removed and replaced with a connection to a fluid supply valve (not shown). When fluid supply valve is opened, and PACV has sufficient pressure differential to operate flow will occur across the branch PACV. When the fluid supply valve is closed, the pressure decays and PACV spring force closes the slidable members of the cartridge valve assemblies 10A, 10B, and 10C so that they perform like passive check valves.

The various embodiments and typical operational uses as shown above and described herein are not representative of all possibilities since additional fluid control, valve working fluid (hydraulic or pneumatic) or actuation mechanisms and other fluid circuitry layouts could benefit from inclusion of the piston activated cartridge valves.

The valves and components thereof described herein can be made in any suitable manner. The body of the PACV is a typical fluid fitting with at least one branch connection. The fitting end connections can be flared, threaded (FIG. 16), flanged or the like. The fitting ends of the branches in which the PACV internals and actuator piston are disposed may require machining of grooves to limit how far the components can be inserted into the fitting ends) using known techniques.

The components of the PACV can be made of any suitable materials. The materials will depend upon the use of the PACV. Suitable materials for various uses include, but are not limited to: ferrous metals such as carbon steel (CS), galvanized steel, impact-tested carbon steel (ITCS), low-temperature carbon steel (LTCS), stainless steel, malleable iron, chrome-molybdenum (alloy) steel; and non-ferrous metals such as: copper, inconel, incoloy, cupronickel, and titanium; and non-metallic materials such as: acrylonitrile butadiene styrene (ABS), fiber-reinforced plastic (FRP), polyvinyl chloride (PVC), and high-density polyethylene (HDPE). All metallic and/or non-metallic material used in PACV should be compatible with the fluid that flows therethrough.

The parts of the PACV including the cartridge housing, the slidable member, the stop, and the actuator piston may be manufactured using conventional techniques such as casting, machining, and/or additive manufacturing processes. The cartridge housing may have accommodations formed therein for installation of slidable member and stop. The slidable member may be made from any suitable material having sufficient strength to withstand the sealing and operation by actuator piston.

The valves, the components used to create the valves, the system, and the various fluid circuits that can be created using the insertable devices described herein can provide a number of advantages. It should be understood, however, that these advantages need not be required unless they are set forth in the appended claims.

The PACV system of insertable components can be used with existing valve bodies, and does not require the construction of new valve bodies. The PACV is scalable to any size for different size valve bodies. The PACV components can be inserted into any Tee, Cross or union type fitting connections for which is adaptable and configurable for any type, hub, flange or flare type piping or tubing end connection. The PACV supports line replaceable unit maintenance if worn or damaged without entire loss of the valve body. The PACV internal components can be swapped out quickly if worn out or damaged, reducing system downtime.

The PACV can allow multi-directional flow across at least two openings, and allow multi-directional isolation across any opening. The PACV can simultaneously provide check valve functionality and valve functionality. The cartridge assembly housings may be reversible within the fitting to provide different flow control characteristics.

The PACV actuator piston is conformable and retainable within the hub, flange or flare fitting connection, can operate multiple controllable flow elements contained within the valve body. The PACV actuator piston is a tight tolerance device that is capable of linear and/or rotational motion, and is designed to minimize leaks.

A plurality of PACV's assemblies can be operated with single actuator (or actuating force), such as a solenoid operated valve (SOV) actuator. The PACV actuator mechanism or pressure source can be decoupled from the actuator piston allowing for the remoting of the mechanism from the valve body. The PACV decoupled actuator mechanism or pressure source can actuate multiple PACV's which could be spread across different fluid circuits.

The PACV simultaneously allows for flow through and retention of, the reversible connection which houses the sealing and flow through device. The PACV is adaptable for both open/close and throttle control operational capability. Throttle control flow rate provides proportional control of the flow rate depending on how much the slidable member is opened.

The PACV reduces complexity of systems and therefore reduces recurring and non-recurring costs. The PACV requires minimal modifications and a minimum number of parts to produce, has few moving parts and can be made with less precision lowering production cost. The PACV can be used in typical fluid fittings, such as tees and crosses, thereby increasing adoption across multiple industries further reducing costs. The PACV reduces the number of fluid fittings required in comparison to prior fluid circuits. The PACV also reduces the use of welding and reduces the number of joints.

The term "joined", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A cartridge valve assembly comprising:
a cartridge housing having a longitudinal axis, a first end defining a first opening, a second end defining a second opening, a generally cylindrical exterior, an internal space extending between said first and second openings, and an interior surface defining said internal space, wherein the internal surface of the cartridge housing comprises a plurality of sections from the first end of the cartridge housing to the second end of the cartridge housing, said sections including an intermediate section that provides a tapered sealing surface;
a stop located within the internal space of said cartridge housing at a location that is closer to the first end of the housing than the second end of the housing, wherein said stop has a first end, a second end, and sides;
a movable slidable member located at least partially within the internal space of said cartridge housing, said slidable member having a first end, a second end, and sides, wherein said stop limits the motion of the slidable member toward the first end of the housing, wherein at least a portion of the sides of the slidable member comprises an intermediate portion that is configured to form a seal with the tapered sealing surface of said cartridge housing; and
a spring positioned between said stop and said slidable member, said spring having two ends comprising a first end and a second end, an uncompressed configuration, and a compressed configuration, wherein the second end of said spring is adjacent the first end of the slidable member and the first end of the spring is adjacent the second end of the stop,
wherein said slidable member is movable between a closed position and an open position, wherein when said spring is in its uncompressed configuration the slidable member is in its closed position and the second end of the slidable member extends outward beyond the second end of the cartridge housing, and wherein the second end of the slidable member is configured to be contacted by an actuator piston that moves in a direction perpendicular to the longitudinal axis of the cartridge housing and which moves the slidable member toward the first end of the cartridge housing and compresses the spring, and when the spring is compressed the slidable member is in its open position and the interior surface of said cartridge housing and the sides of said slidable member are configured so that when said slidable member is in the open position, at least one fluid flow path is provided between the first and second openings of the cartridge housing, wherein fluid can alternatively flow in one of the following directions: (a) from the first opening to the second opening or (b) from the second opening to the first opening.

2. The cartridge valve assembly of claim 1 wherein the interior surface of the cartridge housing comprises a first section that has a circular cross-section, wherein the stop is located within the first section of the interior surface of the cartridge housing and portions of the sides of the stop are adjacent to the first section of the interior surface of the cartridge housing, and the sides of the stop have a least one recessed area therein extending longitudinally from said first end to said second end of said stop to form said fluid flow path between the sides of the stop and the first section of the interior surface of the cartridge housing.

3. The cartridge valve assembly of claim 1 wherein the interior surface of the cartridge housing comprises a first section that has a partially circular cross-section wherein longitudinal recesses are formed in the first section of the interior surface of the cartridge housing that extend beyond both the first end and said second end of said stop to form said fluid flow path between the sides of the stop and the first section of the interior surface of the cartridge housing.

4. The cartridge valve assembly of claim 1 wherein the second end of said stop has an opening therein for retaining the first end of said spring.

5. The cartridge valve assembly of claim 1 wherein said first end of said slidable member has an opening therein for retaining the second end of said spring.

6. The cartridge valve assembly of claim 1 wherein the spring has an uncompressed configuration and a compressed configuration, wherein there is a space between the second end of the stop and the first end of the slidable member when the spring is in its uncompressed configuration.

7. The cartridge valve assembly of claim 1 wherein the cartridge housing terminates at the second opening, and the slidable member comprises a first portion and a second portion, wherein said first portion of the slidable member is positioned on one side of the intermediate portion so that the first portion of the slidable member is closer to the first end of the cartridge housing and the second portion of the slidable member is positioned on the other side of said intermediate portion so that the second end of the slidable member protrudes from the second opening of the cartridge housing, and wherein the second portion of the slidable member has a cross-section that is smaller than the cross-section of at least some part of the first portion of the slidable member, and a portion of the surface of the second portion of said slidable member has a plurality of longitudinally-oriented flow channels therein so that fluid may flow in said flow channels between the second portion of the slidable member and the interior surface of said cartridge housing.

8. The cartridge valve assembly of claim 1 wherein the interior surface of said cartridge housing has a partially circular cross-section wherein longitudinal recesses are formed in the interior surface of the cartridge housing that extend from a portion of the interior surface of the cartridge housing to the second end of the cartridge housing to form at least part of said fluid flow path between the sides of the second portion of the slidable member and the interior surface of the cartridge housing.

9. The cartridge valve assembly of claim 1 wherein the first and second portions of the slidable member comprises separate components that are positioned adjacent to each other and are in contact with each other.

10. The cartridge valve assembly of claim 1 wherein the first end of the cartridge housing comprises a flange that projects outward from the generally cylindrical exterior of the cartridge housing.

11. The cartridge valve assembly of claim 1 wherein the second end of the slidable member has a rounded tip.

12. A combination of components for fitting into pipes to create a piston-activated cartridge valve, said combination comprising:

a cartridge valve assembly according to claim 1; and an actuator piston assembly comprising a generally cylindrical piston housing having a first end defining a first piston housing opening, a second end defining a second piston housing opening, a generally cylindrical exterior, an internal space extending between said first and second openings, and an interior surface defining said internal space, wherein at least a portion of said interior surface of said piston housing has a circular cross-section wherein an actuator piston is inserted into the internal space in said piston housing, said actuator piston assembly being configured to be oriented perpendicular to the longitudinal axis of the cartridge housing of the cartridge valve assembly, and said actuator piston is configured to be movable to engage the second end of the slidable member of the cartridge valve assembly at a right angle in order to move the slidable member of the cartridge valve assembly toward the first end of the cartridge housing and compress the spring of the cartridge valve assembly and provide said at least one flow path between the first and second openings of the cartridge housing.

* * * * *